United States Patent [19]
Karrer

[11] Patent Number: 5,882,058
[45] Date of Patent: Mar. 16, 1999

[54] MODULAR CARGO ANCHORING AND PROTECTION SYSTEM FOR PICKUP TRUCKS

[76] Inventor: Robert B. Karrer, P.O. Box 3183, Smithers, British Columbia, Canada, V0J 2N0

[21] Appl. No.: 807,752

[22] Filed: Feb. 27, 1997

[30] Foreign Application Priority Data

Jun. 7, 1996 [CA] Canada .................................. 2178224

[51] Int. Cl.$^6$ ................................................. B62D 33/00
[52] U.S. Cl. ...................... 296/39.2; 293/117; 296/100.01
[58] Field of Search ................................ 293/117; 296/3, 296/10, 37.6, 39.1, 39.2, 100, 100.01, 100.02, 100.06, 100.17

[56] References Cited

U.S. PATENT DOCUMENTS

| | | | |
|---|---|---|---|
| 4,547,014 | 10/1985 | Wicker | 296/100 |
| 4,575,146 | 3/1986 | Markos | 296/39 R |
| 4,936,724 | 6/1990 | Dutton | 410/110 |
| 4,944,612 | 7/1990 | Abstetar et al. | 396/39.2 |
| 4,958,876 | 9/1990 | Diaco et al. | 296/39.2 |
| 4,969,784 | 11/1990 | Yanke | 410/104 |
| 5,052,739 | 10/1991 | Irwin | 296/37.6 |
| 5,127,701 | 7/1992 | Miller | 296/100 |
| 5,150,940 | 9/1992 | Kennedy | 296/39.2 |
| 5,154,478 | 10/1992 | Erickson | 296/39.2 |
| 5,228,736 | 7/1993 | Dutton | 296/39.2 |
| 5,263,761 | 11/1993 | Hathaway et al. | 296/100 |
| 5,393,114 | 2/1995 | Christensen | 296/36 |
| 5,419,602 | 5/1995 | VanHoose | 296/39.1 |
| 5,454,612 | 10/1995 | Christensen | 296/3 |
| 5,470,120 | 11/1995 | Christensen | 296/3 |
| 5,494,327 | 2/1996 | Derecktor | 296/3 |
| 5,584,521 | 12/1996 | Hathaway | 296/100 |

FOREIGN PATENT DOCUMENTS 1330572 7/1994 Canada .

Primary Examiner—Sherman Basinger
Attorney, Agent, or Firm—Rogers & Scott

[57] ABSTRACT

A cargo anchoring and protection system particularly is provided for pickup trucks. The system includes six basic contributing components that operate individually or together to multiply their usefulness. These include: a pair of extruded anchor rails are provided to be removably attached to the top surface of the truck bed side walls; a bed liner with an optional separate floor section; a universal anchor beam; a cab guard with optional cargo access doors; a cargo bed enclosure; and a rear bumper.

22 Claims, 21 Drawing Sheets

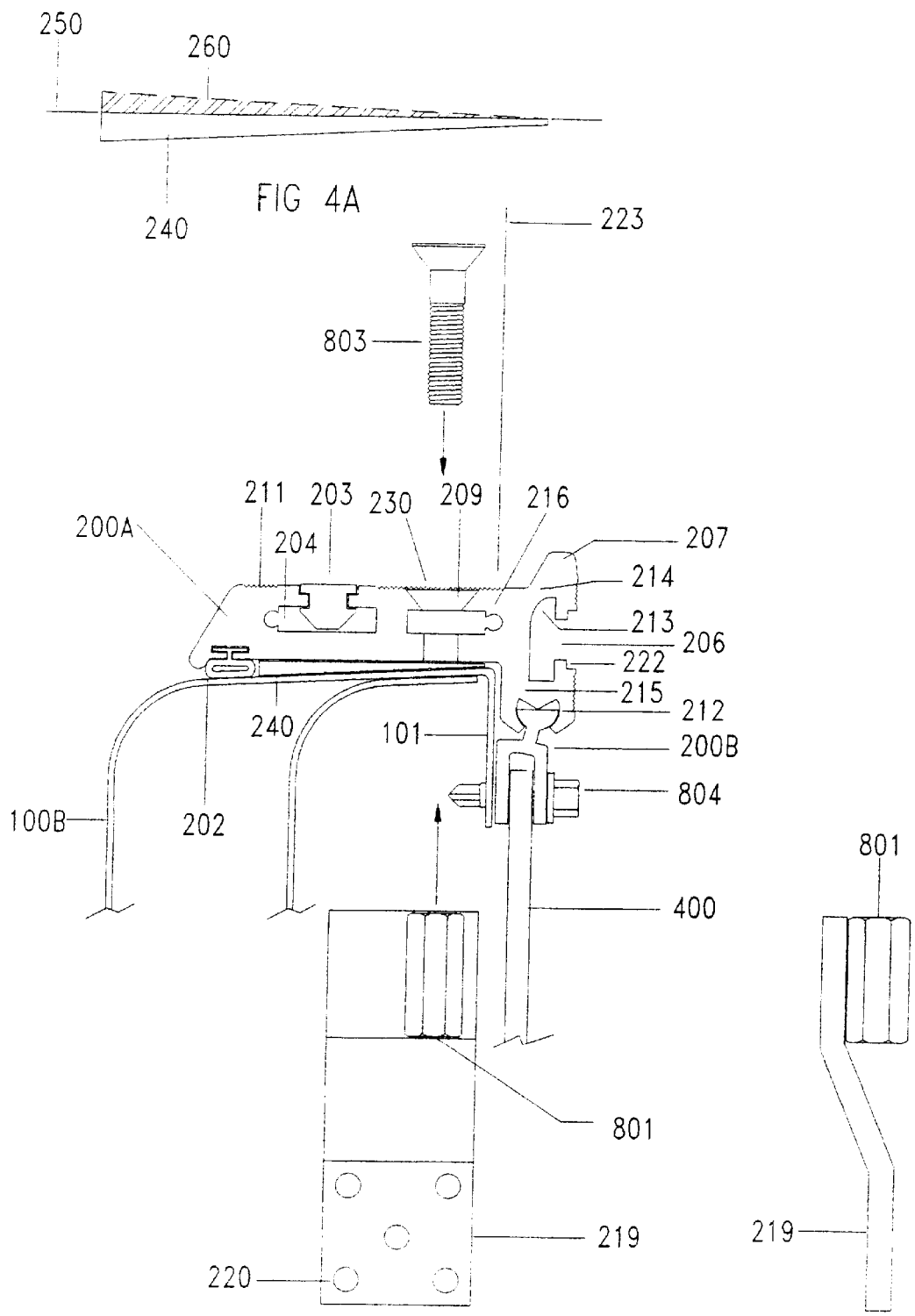

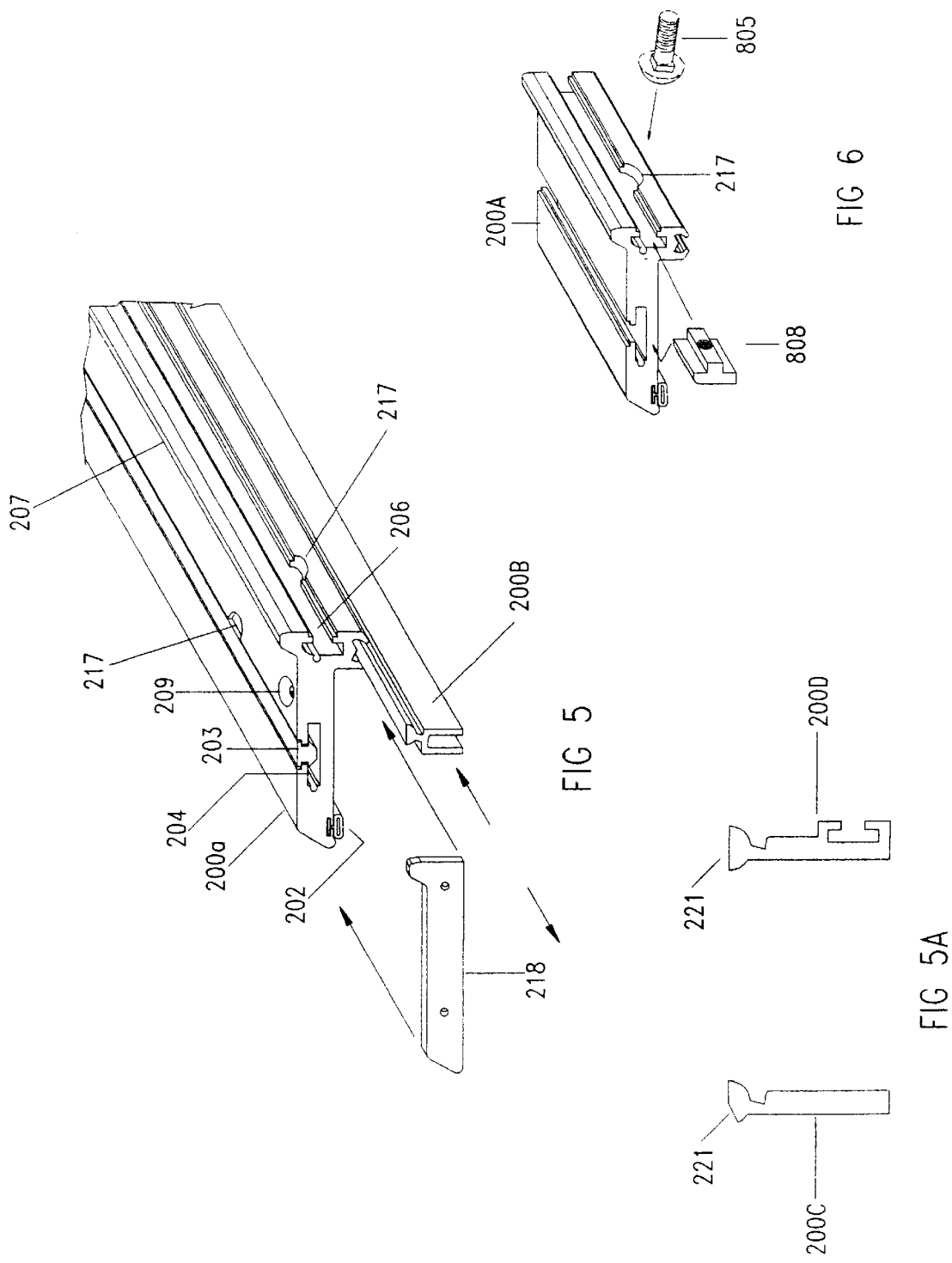

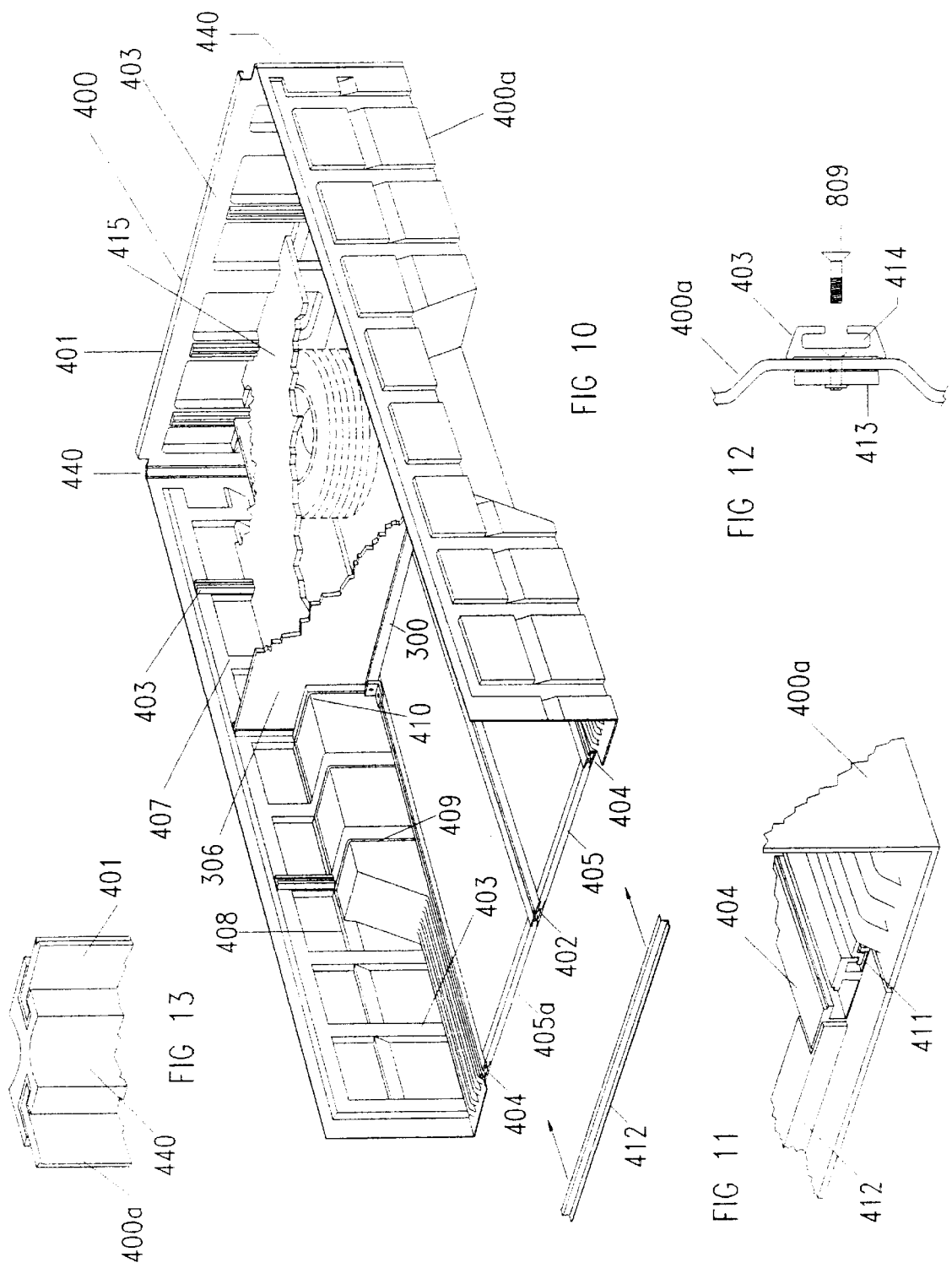

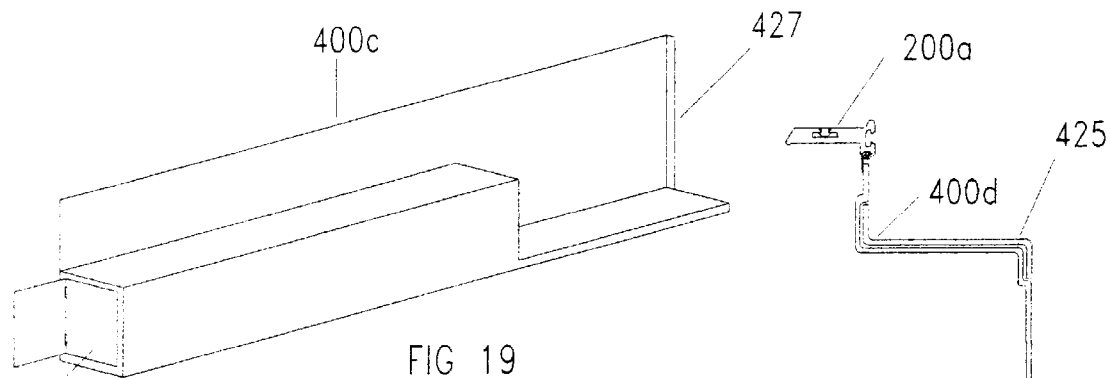
FIG 19
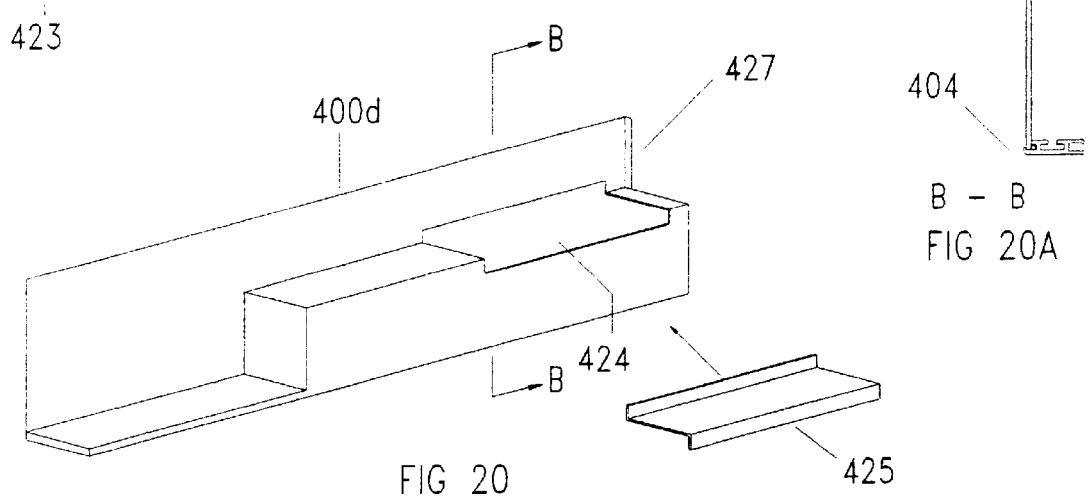
FIG 20
B - B
FIG 20A
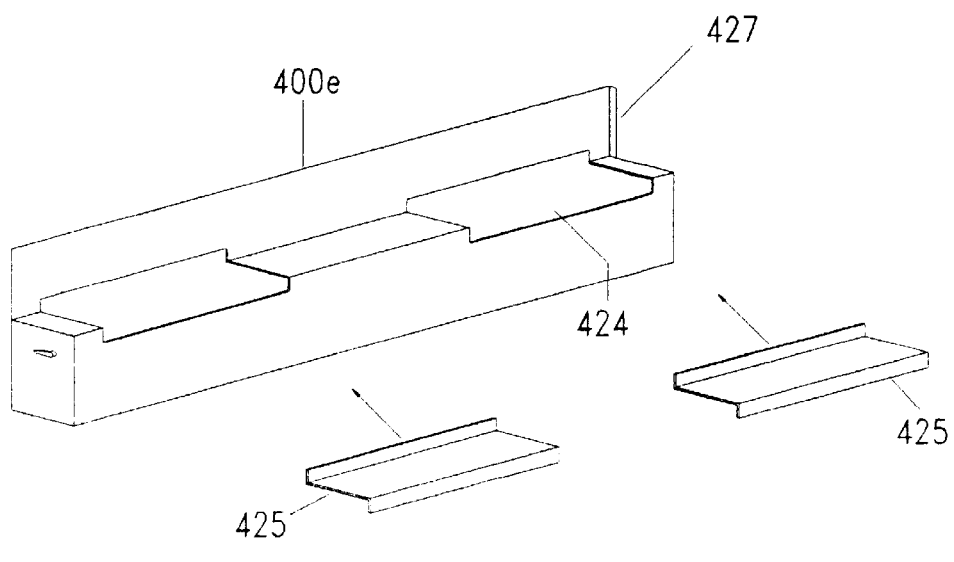
FIG 21

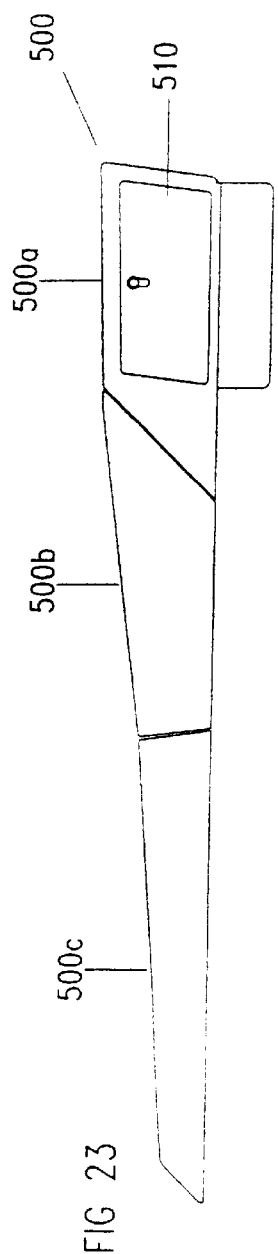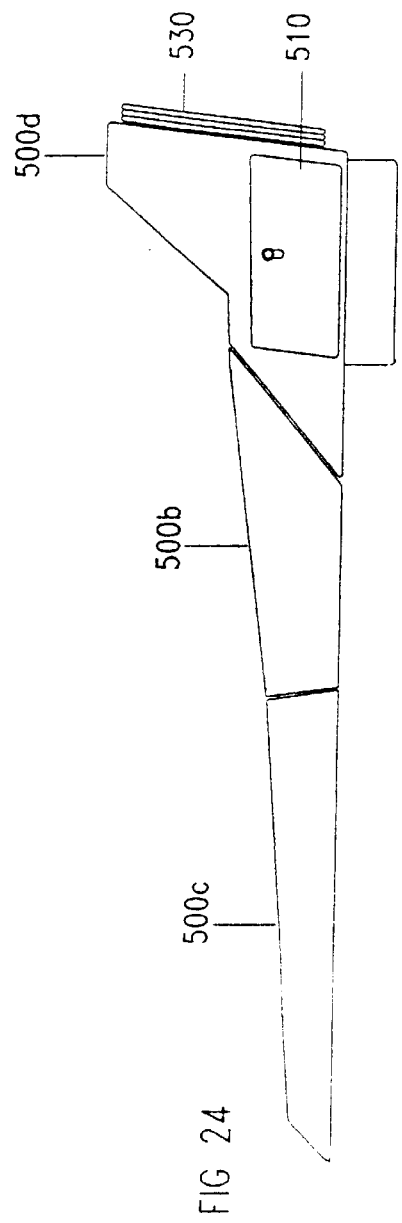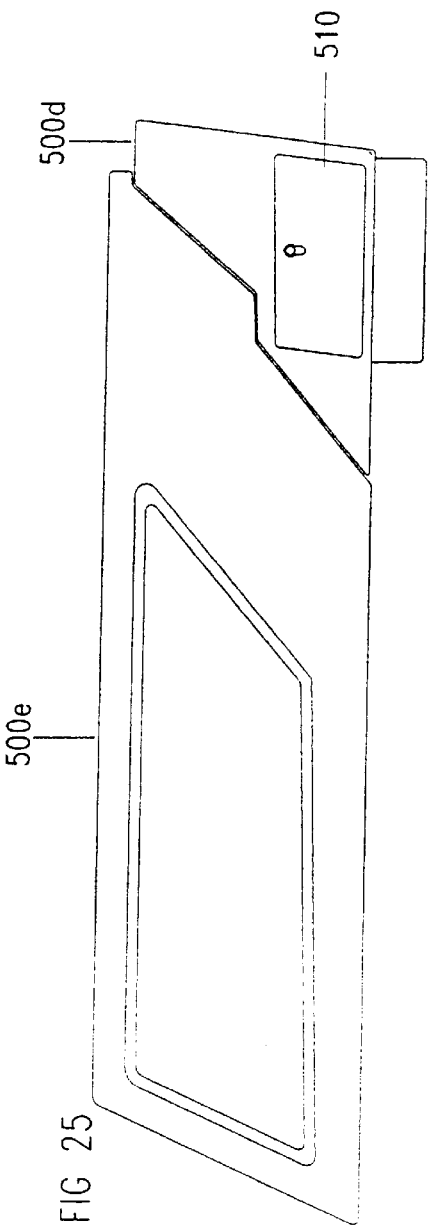

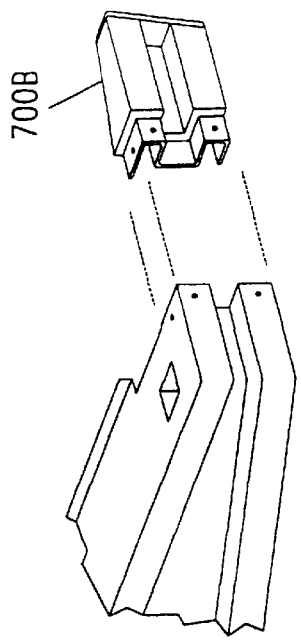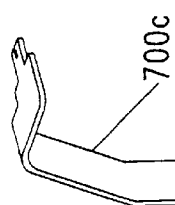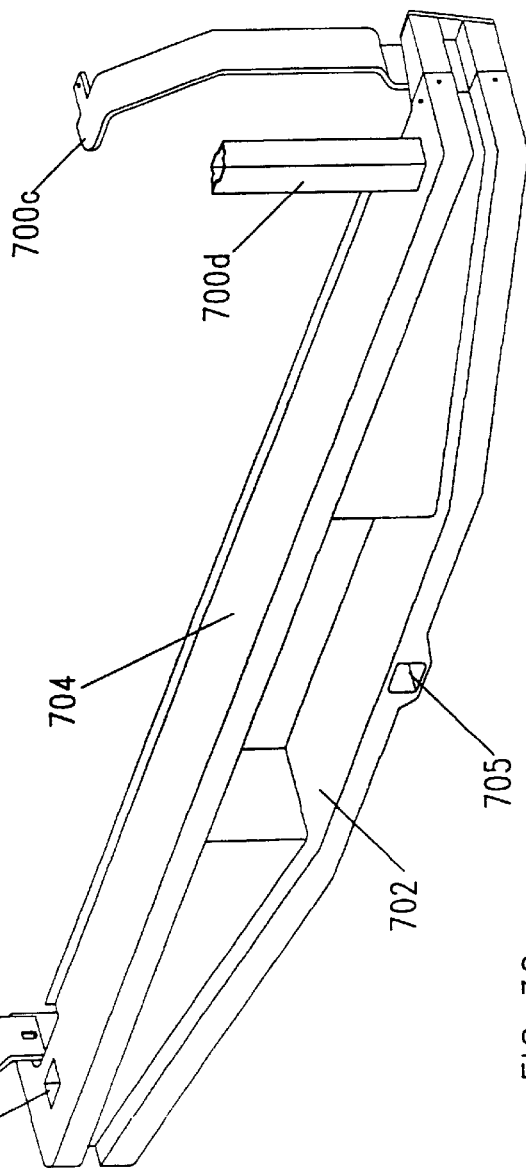
FIG 31
FIG 30

MODULAR CARGO ANCHORING AND PROTECTION SYSTEM FOR PICKUP TRUCKS

FIELD OF THE INVENTION

This invention relates to pickup trucks and more particularly to a cargo anchoring and protection system for the cargo bed of the pickup truck.

BACKGROUND OF THE INVENTION

Accessories such as cab guards, bed liners, protective bed rail caps and cargo enclosures have been used in the past on pickup trucks. They are generally designed and manufactured without consideration being given to the relationship between the accessories. In fact the accessories often conflict with one another. Furthermore, most of the accessories offered today either attempt to protect the truck bed area or enhance cargo carrying capacity, but not both. Accordingly, a need exists for a cargo anchoring and protection system which allows the use of all desired accessories to be used in conjunction with one another. Furthermore a need exists for a system which is capable of dividing the cargo area into more usable compartments, securely carrying a wide variety of cargo, protecting the pickup bed area from damage and protecting the cargo in the truck bed area from the elements, theft, and damage caused by loads moving as the pickup truck travels over rough terrain.

SUMMARY OF THE INVENTION

The present invention addresses the limitations of the prior art by providing a cargo anchoring and protection system for pickup trucks. The system has several aspects. A first of these aspects is an attachment system which preferably has a pair of elongate anchor rails adapted to rest on the upper surfaces of the respective cargo bed sides, and be fastened thereto in fixed supporting relation. The anchor rails are adapted to be securely affixed to both cargo bed sides and preferably include structure to receive the side walls of a protective bed liner or cargo bed accessories. Each of the anchor rails consists of an elongate member having horizontal and vertical segments, and each of the segments defines a T-slot extending the length of the rail. This provides for the attachment of anchoring devices or a decorative trim seal. The lower portion of the vertical segment preferably defines an elongate channel adapted to accept a corresponding removable mating member for attachment of the cargo bed liner and the like, and an upstanding ridge is optionally included above the vertical segment to repel water from the cargo bed.

The anchor system preferably also includes an anchor beam to be used across the top of the cargo bed and attached to the inner vertically placed T-slots of the anchor rails. The anchor beams can also be placed on the floor of the cargo bed directly below another beam for securing cargo bed dividers. Also, the anchor beam preferably has a hollow generally rectangular cross section which has T-slots on both the outer vertical walls and a T-slot on the outer bottom wall to provide anchoring points for cargo restraining devices. It is also preferable, but optional, to include an inverted channel shape in the outer bottom wall to accept vertical cargo dividers and a pair of integral formed upwardly extending ridges on the top outer corners of the member to act as a weatherguard when used in conjunction with cargo enclosures.

In another of its aspects, the cargo anchoring and protection system preferably includes a cargo bed liner having a formed front segment, first and second side sections, and a multi piece floor section. A plurality of extrusions are provided to accept floor sections and the side sections, and a multi-piece tail gate protector is preferably included. The side sections and front segment preferably define a plurality of vertically and horizontally formed ribs, all of which allow the division of the cargo bed area into smaller compartments when used in conjunction with anchor rails and anchor beams in accordance with the system. Alternatively the bed liner side sections may be formed to incorporate a plurality of lockable storage compartments between the bed liner and the truck bed sides.

In a third of its aspects, the cargo anchoring and protection system preferably includes a cargo bed enclosure intended to be removably attached to the anchor rails and anchor beams of the attachment system to convert the cargo bed into a storage compartment. The enclosure preferably consists of three main components. The first component is a storage box in the form of a front storage compartment adapted to extend across the front of the cargo bed and to be affixed to the mounted anchor rails. The storage box of the enclosure has lockable access doors on both ends to allow access to the enclosure. The second component is a centre lid removably hinged from the top rear edge of the first component and extending rearwardly to cover approximately half the cargo bed area. The side perimeter edges of the centre lid rest and seal on the anchor rails and the rear edge of the lid rests and seals on an anchor beam. The lid provides an individual cargo storage compartment when used in conjunction with the bed liner and dividers of the system. The third component of the enclosure is a formed rear lid removably hinged from the affixed anchor beam and extending rearwardly, the rear edge of this lid resting and sealing on the tail gate portion of the cargo bed to complete the enclosure of the cargo bed. The third component also rests and seals on the anchor rails. If preferred, the lids can be omitted or combined into a single lid.

In yet another of its aspects, the cargo anchoring and protection system preferably includes a cab guard adapted to fasten to T-slots in the mounted anchor rails of the attachment system. The cab guard embodies lockable side doors to allow access to the storage compartment of the aforementioned enclosure and embodies removably fastened side rails for the protection of the sides of the pickup truck bed.

According to still a further aspect of the cargo anchoring and protection system, a rear bumper is preferably provided which is a welded tubular steel assembly for superior strength and a vacuum formed external removable cover incorporating an indented step and license plate guard. The rear bumper assembly incorporates two vertically placed square tubing receivers located at the respective outward corners to accept the mating vertical posts of a rear overhead carrying rack. The posts are braced to the horizontally placed T-slots of the anchor rails of the attachment system. Also a horizontally positioned square tubing receiver is placed centrally to accept a standard towing type hitch. These and other aspects of the present invention will become apparent from the following descriptions of the preferred embodiments of the invention taken in conjunction with the accompanying drawings.

BRIEF DESCRIPTION OF THE DRAWINGS

FIG. 4 is a cross sectional view of the anchor rail assembly installed on the cargo bed sides of the pickup truck;

FIG. 4A is a side view showing exemplary removal of excess material from an anchor rail levelling shim;

FIG. 4B is a side view of a bracket used in the anchor rail assembly and also seen in FIG 4;

FIG. 5 is an exploded perspective view of a portion of the anchor rail of the system;

FIG. 5A shows two cross sectional views of a second and a third embodiment of a removable portion of the anchor rail assembly;

FIG. 6 is an isometric view of a portion of the anchor rail of the system showing (in ghost outline) various means of attaching accessories;

FIG. 10 is an isometric view of a preferred embodiment of a bed liner of the system and showing additional parts cut away;

FIG. 11 is an isometric view of a portion of a floor of the bed liner showing means securing the bed liner floor to the floor of the pickup truck bed;

FIG. 12 is an exploded cross sectional view of a vertically placed cargo restraining device for attachment to the walls of the bed liner;

FIG. 13 is an isometric view showing a portion of the bed liner side wall and the front wall locked in place by means on an extruded corner locking device of the system;

FIG. 19 is an isometric view of a bed liner side system used in a third embodiment of the bed liner, the bed liner side section being formed to incorporate a storage compartment behind the wheel well portion of the bed of the pick up truck;

FIG. 20 is a view similar to FIG. 19 and showing a bed liner side section formed to incorporate a storage compartment ahead of the wheel well portion of the bed of the pick up truck;

FIG. 20A is a cross sectional view of FIG. 20 and showing the third embodiment of the bed liner side section affixed to the anchor rail at the top and to a floor extrusion at the bottom;

FIG. 21 is an isometric view of a bed liner side section used in a fifth embodiment of a bed liner, the bed liner side section being formed to incorporate a storage compartment ahead of and behind the wheel well portion of the bed of the pick up tuck;

FIG. 23 is a side view of a preferred embodiment of cargo enclosure of the system;

FIG. 24 is a side view of a second embodiment of the cargo enclosure of the system, the front portion of the cargo enclosure being of increased height;

FIG. 25 is a side view of a third embodiment of the cargo enclosure of the system;

FIG. 30 is an isometric view of a rear bumper assembly of the system showing the attachment of tail light protectors which form part of the system;

FIG. 31 is an exploded isometric view of a portion of the bumper showing a removable end portion of a bumper cover skin;

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DESCRIPTION OF THE PREFERRED EMBODIMENT(S)

Figure 1:
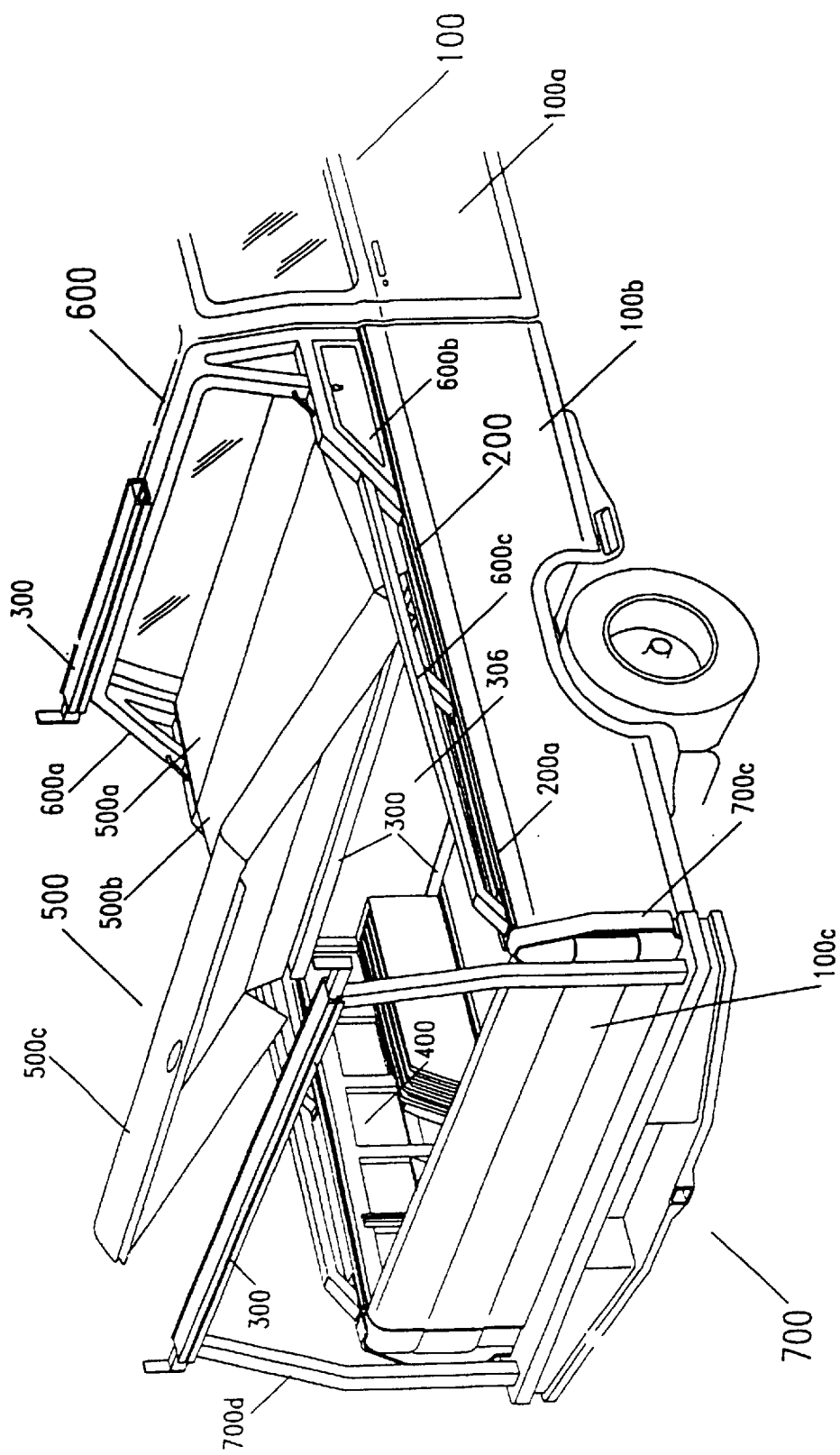
FIG. 1 is an isometric view of a rear part of a pickup truck carrying a preferred embodiment of the cargo anchoring and protection system of the present invention.

Referring now to the drawings, FIG. 1 illustrates a conventional pickup truck designated generally by the numeral 100 and including a cab 100a and a cargo bed 100b having a tailgate 100c on which the preferred embodiment of the invention is mounted. The preferred embodiment of the cargo anchoring and protection system consists of several parts. Firstly an attachment system 200 having a pair of anchor rails 200a and extruded cross bed anchor beams 300. The invention also provides a bed liner 400; an enclosure 500; a cab guard 600; and a rear bumper 700. For clarity a rear lid portion 500c of the enclosure 500 is shown in an open position to view the cargo area of the cargo bed 100b.

The various parts of the invention will be described with reference to the drawings.

(a) Attachment System

Figure 2:
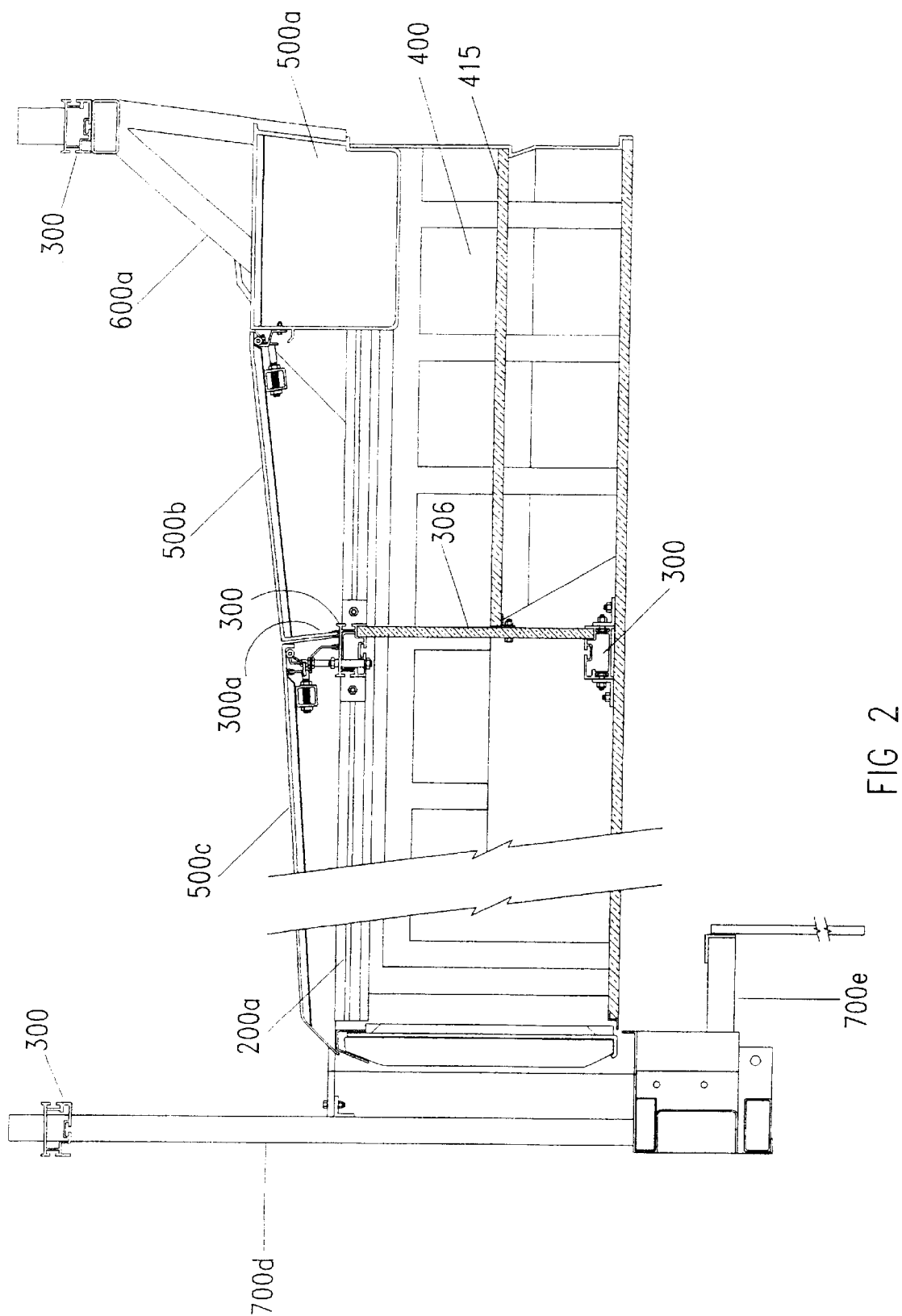
FIG. 2 is a cross sectional side view of the cargo anchoring and protection system shown in FIG. 1.

Referring now to FIG. 2, this cross sectional view illustrates details of the attachment system also referred to as a cargo anchoring and protection system. The importance of the anchor beams 300 is displayed as the top beam provides a base for mounting the hinge of rear lid 500c, a base to seal the edge of a centre lid 500b, a channel 300a to drain weather from the enclosure, and also provides an integral recessed channel to secure the top of a vertical divider 306. The anchor beam 300 secures the bottom of the vertical divider to the floor extrusions and provides a multitude of cargo anchoring points. FIG. 2 clearly shows the storage area provided in the front storage compartment 500a of the enclosure 500. FIG. 2 also shows how the anchor beam 300 adapts for use as an over cab cargo rack when combined with a rear overhead cargo rack 700d and a front segment 600a.

Figure 3:
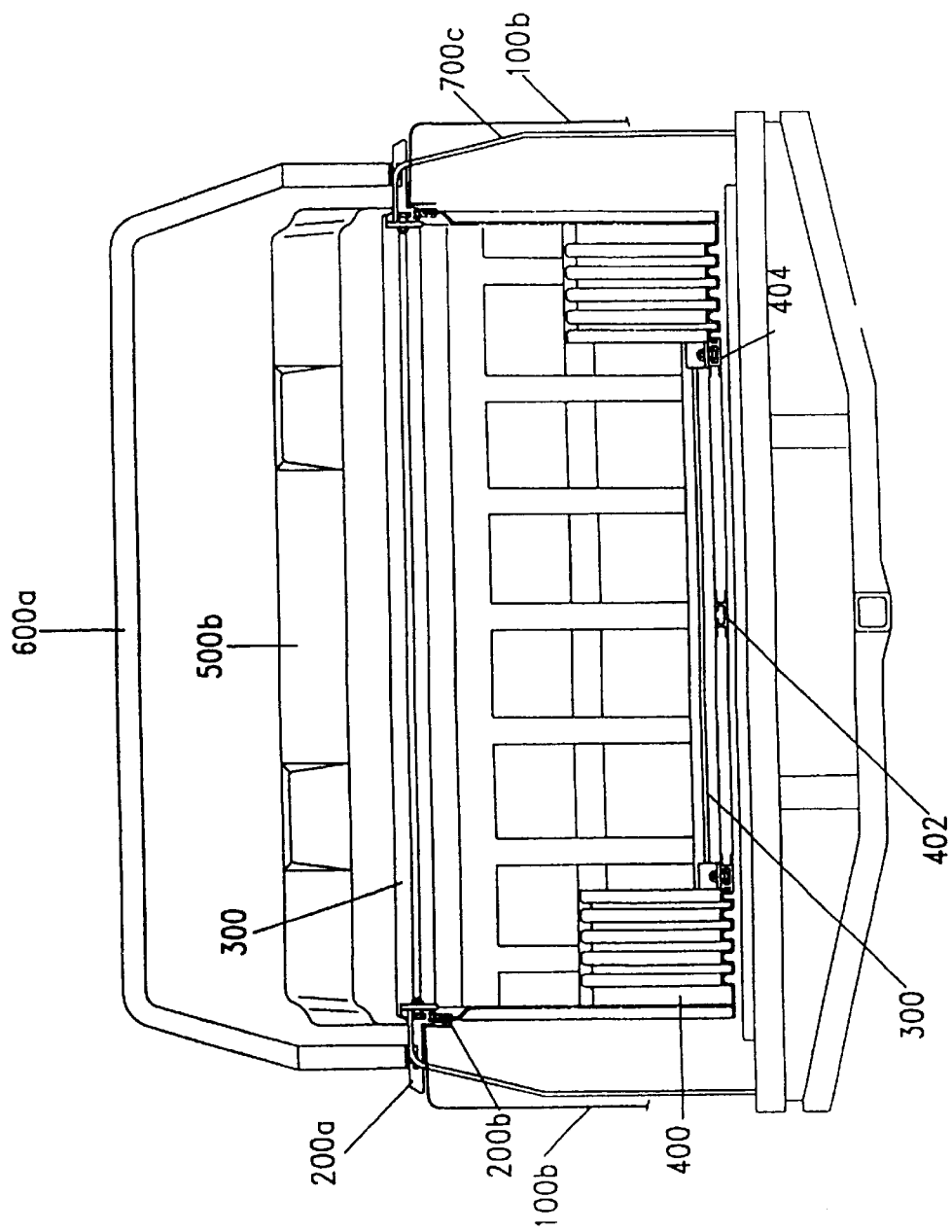
FIG. 3 is a cross sectional end view looking from behind the truck and showing the cargo anchoring and protection system.

The cross sectional end view of FIG. 3 displays the anchor rails 200a as the base for mounting the components of the cargo anchoring and protection system. The anchor rails are attached to upper surfaces of sides 100b of the cargo bed and provide a mounting base for the front segment 600a of the cab guard, the bed liner 400, tail light protectors 700c, and the cross anchor beam 300, as well as providing a sealing ridge for the enclosure 500. FIG. 3 also displays how the anchor beam 300 bolts to floor extrusion 404 by using an angle bracket. This drawing also reveals T-slots available for securing cargo or accessories.

Referring now specifically to the individual components of the cargo anchoring and protection system, FIG. 4 shows a cross sectional view of the anchor rail 200a assembled with an interlocking removable member 200b. The anchor rail 200a comprises an elongated extruded member having a horizontal segment 230 adapted to rest atop the side 100b of the cargo bed, and a vertical segment extending downwardly inside the cargo bed adjacent a flange 101 to receive a the removable member 200b which is adapted to retain the side wall of the protective bed liner 400. The anchor rail 200a preferably comprises an elongate member having a generally "T-shaped" cross section with horizontal and vertical segments, each having inside and outside walls. Each of the outer walls embodies a stepped inverted T-slot, one placed horizontally 204 and one placed vertically 206 adapted to allow the anchoring of devices or a decorative trim seal 203. All T-slots in this invention embody small ledges 222 on both sides of the T-slot openings. These ledges 222 act to control the depth of the decorative trim seal 203 and therefore provide a consistent fit as displayed in the T-slot 204 of FIG. 4. The outer walls of the anchor rail 200a embody a plurality of formed shallow V-shaped grooves 211 to prevent slippage of anchoring devices. The inner top corner of the anchor rail 200a embodies an integral vertically protruding ridge 207 acting as a weather guard and guide rail for the lids of the enclosure 500.

The lower portion of the vertical segment of the anchor rail 200a embodies a semi-circular elongate channel 212 designed to accept the removable interlocking member 200b. The anchor rail 200a further comprises an elongate T-slot embodied in the inner horizontal wall to accept a flexible bulb type seal 202 providing a weather seal between the anchor rail 200a and the pickup truck cargo bed side 100b. The anchor rail embodies an internal cavity 208 for cost saving measures. The elongate interlocking removable member 200b has a mating channel on its top outer surface to be interlockingly slid into the mating channel 212 in the anchor rail 200a. The elongate interlocking removable member 200b further embodies an inverted recessed "U-shaped" channel facing downward to accept and secure the top of the side wall of bed liner 400. The broken line 223 shown in FIG. 4 is drawn to illustrate how the weather guard ridge 207 is inboard of the wall 100b of the cargo bed so that most truck caps presently manufactured can be removably attached to the anchor rails 200a. The distance between the T-slot 204 and the drain ridge 207 is necessary to adapt and allow the cab guard 600 and the bed enclosure 500 to be mounted on the anchor rail at the same time. The size and location of the T-slot 206 was achieved without increasing the thickness or height of the horizontal segment of the anchor rail 200a by using a compact channel 212 and by incorporting a radiused corner 213 in the vertical T-slot 206. These two features enable the required thickness of the extrusion to be maintained in zones 214 and 215. This maintains a compact shape for the extruded anchor rail 200a and yet allows the T-slot 206 to be located in this vital area. The compact shape of the extruded anchor rail 200a also permits the screw 804 to lock the panel of the bed liner 400 in the anchor rail 200a and to the narrow flange 101 at the same time. Grooves 216 are provided to accept self tapping screws to mount end caps 218 seen in FIG. 5.

FIG. 4B shows a side view of a preferred mounting bracket 219 which (as seen in FIG. 4) is meant to be attached to an inner side wall of the truck cargo bed 100b by fasteners through holes 220 and a fastener 803 placed down through a countersunk opening 209 in the horizontal segment of the anchor rail 200a, the cargo bed side 100b and affixed to a nut 801 on the mounting bracket 219 providing a secure attachment of the anchor rails 200a. The top surfaces of the rail on the sides 100b of the truck cargo bed have inconsistent and unpredictable angles. To accommodate this, a plurality of oversized, flexible, self-adhesive shims 240 (FIG. 4A) are provided to enable the anchor rail 200a to be mounted level on the pickup truck sides 100b. The shaded area 260 in FIG. 4A displays how excess material can be taken off the shim 240 to provide a level surface for mounting the anchor rail 200a.

Reference is next made to FIG. 5 which shows the sliding action of the elongate interlocking removable members 200c, and also shows how the decorative end cap 218 is affixed to either end of the anchor rail 200a. FIG. 5A shows two views of a second embodiment of the elongate interlocking removable member and designated 200c. In this case a portion is removed to form an angled face 221 so that the member 200c can be rotated for quick removal from the anchor rail 200a. Also shown is a third embodiment (designated 200d) of the elongate interlocking removable member. This embodiment has a T-slot offering a multitude of anchoring points, and a semi-circular shape to provide a hinge for the lids of several variations of bedliner sides. (See FIGS. 14, 15 and 16).

FIG. 6 shows a variety of means of attaching accessories to the anchor rail 200a. The first being a standard carriage bolt 805 and the second is a T-slot nut 808, both of which can be used anywhere along the anchor rail 200a. Only one side of the inverted T-slot opening has a notch 217 to allow the head of a carriage bolt 805 to enter the inverted T-slots at a steep angle instead of sliding them in from either end. This will maintain one half the holding strength of the carriage bolt when it is tightened directly over this half circle entrance notch 217.

Figure 7A:
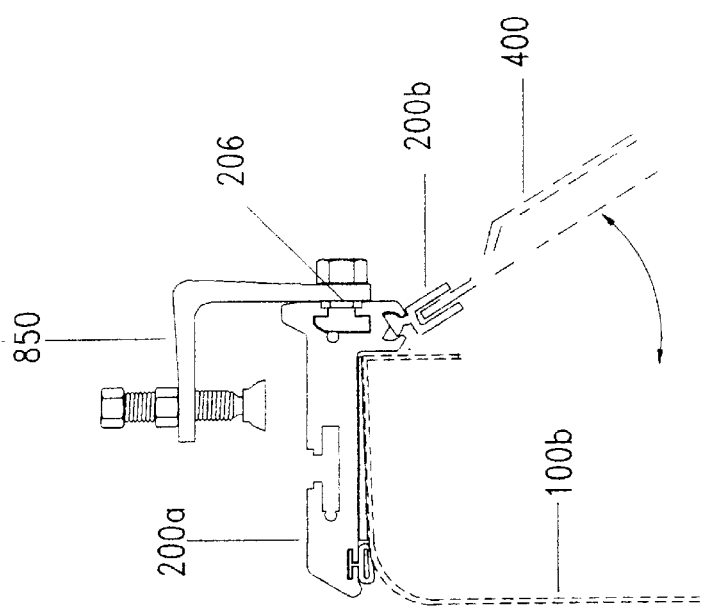
FIG. 7A is a cross sectional view of the second embodiment with the clamp inverted for use to secure various accessories to the anchor rail of the system.

In the preferred embodiment of the cargo anchoring and protection system the anchor rails 200a (FIG. 4) are securely fastened to the rails using bolts. However, other arrangements are possible. In a second embodiment shown in FIG. 6A to 7A the anchor rails 200a are removably attached by means of a plurality of clamps 850 which are generally "L-shaped" and are adapted to attach to the vertically placed T-slot 206 in the anchor rail 200a. A vertically adjustable threaded screw 851 is provided for tightening to securely attach the anchor rail 200a to the pickup truck cargo bed sides 100b. The "L-shaped" clamps 850 can also be used to secure truck caps and a variety of accessories to the anchor rails 200a as shown in FIG. 7A. The importance of the rotating feature of the extrusion 200b is also displayed in FIG. 7A which shows how the side wall of the bed liner 400 can be rotated to miss the wheel well inside the truck bed.

Figure 7:
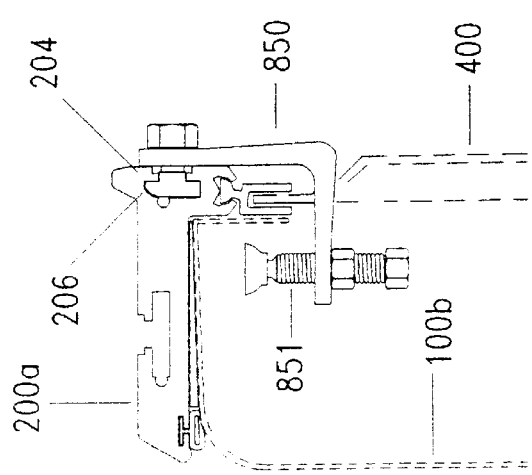
FIG. 7 is a cross sectional view of a second embodiment of structure including a clamp for removably attaching the anchor rail of the system to the cargo bed of the pick-up truck.
Figure 8A:
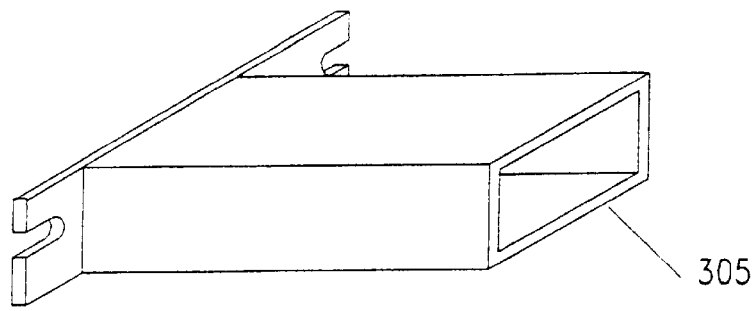
FIG. 8A is an isometric view of an anchor beam mounting bracket.
Figure 8:
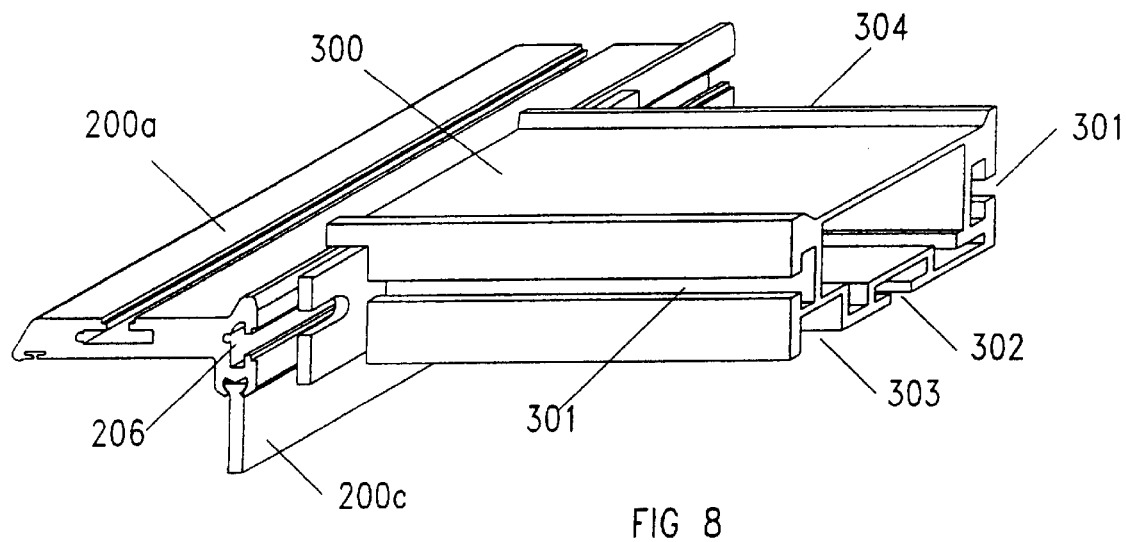
FIG. 8 is an isometric view of a portion of the preferred embodiment of the anchor beam attached to part of an anchor rail of the system.
Figure 9:
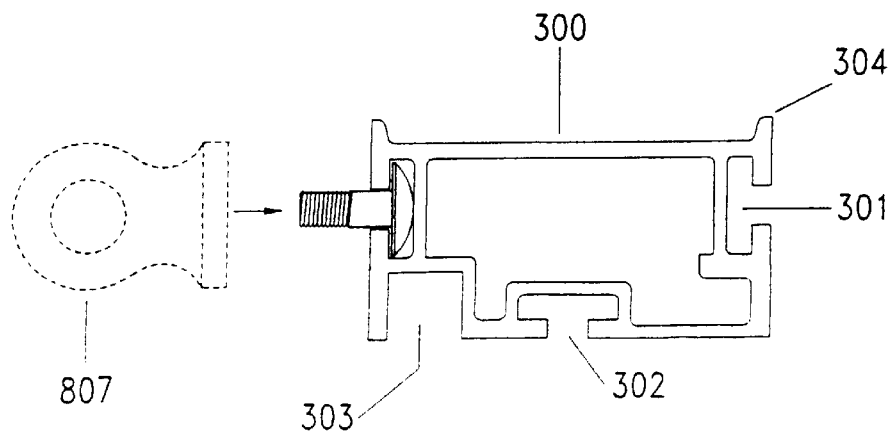
FIG. 9 is a cross sectional view of the anchor beam showing a means of attaching cargo restraints seen in ghost outline.

Reference is now made to FIGS. 8 and 9 to describe the cross bed anchor beam 300 of the system. The beam is made to be mounted across the top of the cargo bed and attached to the inner vertically placed T-slot 206 embodied in the anchor rail 200a as shown in FIG. 7. A second anchor beam is placed across the floor of the bed directly below the first member to provide a base for securing cargo bed dividers seen in FIG. 2, as well as providing numerous anchoring points for holding cargo in place. The anchor beam 300 has a generally hollow rectangular cross section which embodies T-slots 301 on both of its outer vertical walls and on its outer bottom wall 302, plus a recessed channel 303 to accept vertically placed cargo dividers, such as those seen in FIGS. 2 and 10. The top outer corners embody integrally formed upward extending ridges 304 acting as guide rails and weather drain ridges when used with the cargo enclosure 500 of the system.

FIG. 8A displays an adjustable mounting bracket 305 adapted to slide into the end of the anchor beam 300 to simplify installation and FIG. 9 displays a typical cargo anchor eye 807 which can be used to secure cargo to the T-slots of the system.

(b) Bed Liner

Reference is next made to FIG. 10 which illustrates the bed liner 400 of the system. The bed liner consists of a pair of formed side sections 400a, a formed front segment 401, a multi piece floor 405a consisting of wooden floor sections 405, the pair of elongate side extrusions 404, and a central extrusion 402. These extrusions include stepped T-slots. A pair of upright extruded corner pieces 440 lock the front segment 401 to the side walls sections 400a as shown in FIG. 13. The bed liner sides sections 400a and the formed bed liner front segment 401 include a plurality of vertically and horizontally formed ribs 407 adapted to stiffen the bed liner side walls and provide a base for the attachment of vertically or horizontally affixed extruded strips 403 which have T-slots providing means for securing cargo and bed liner dividers. The bed liner sides section 400a and the bed liner front segment 401 also have a plurality of horizontally formed ribs 408 adapted to stiffen the bed liner walls and provide a ledge to accept horizontally placed shelves 415.

It will also be seen in FIG. 10 that the side section 400a includes a formed wheel well cover 409.

Reference is now made to FIG. 11 which is a view of the bottom rear corner of the bed liner side section 400a where it meets the extruded floor extension 404 and a "Z-shaped" floor anchor 412 meant to secure the bed liner floor to the cargo bed of a pickup truck. A vertically affixed extruded cargo restraint 403 (FIG. 12) having a T-slot 414 can be attached to the bed liner side section 400a by the use of a backing plate 413 which accepts fasteners 808. The anchor rails 200a(FIG. 2) are used to interlock the side section 400a of the bed liner 400 to the truck bed rails as seen in FIGS. 7 and 7A.

Figure 14:
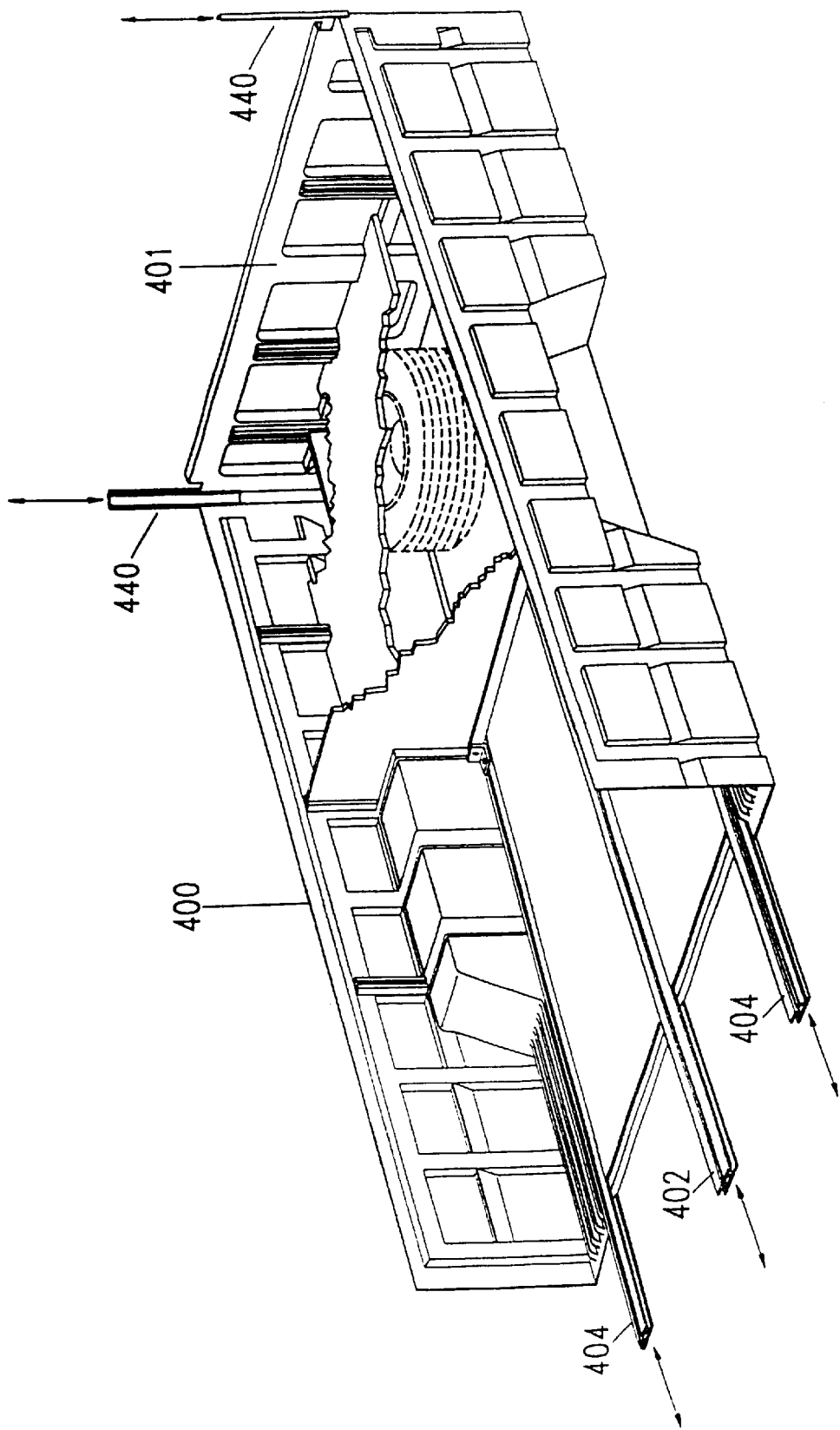
FIG. 14 is a partially exploded isometric view of the bed liner showing the arrangement of extrusions securing the various parts together.

The exploded view in FIG. 14 clearly shows the extruded members of the bed liner, all of which are designed to be slid into place, locking the components together to provide a solid cargo anchoring and protection system in the cargo bed of a pickup truck.

Figure 15A:
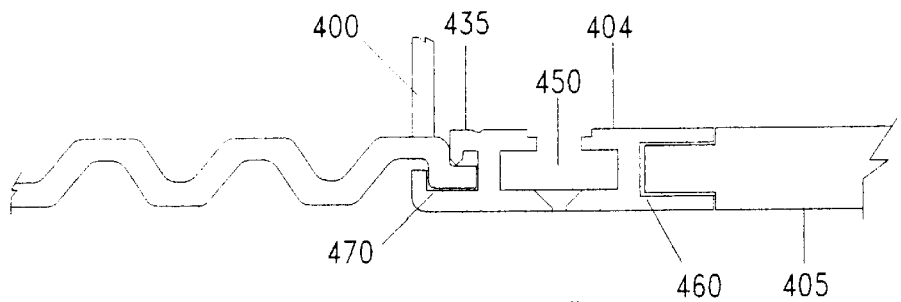
FIG. 15A is a cross sectional view of a preferred extrusion used to secure the bed liner side and the floor of the bed liner of the system to the floor of the pickup truck cargo bed.

FIG. 15A is a cross sectional view of the preferred embodiment of the elongate floor extrusion 404 which is embodied in the floor of the bed liner. The extrusion 404 has an upwardly opening T-slot 450 for general use in attaching to the floor of the cargo bed. The extrusion also provides a means of securing the side wall of the bed liner 400 and the wooden floor sections 405 in place by way of recessed "U-shaped" channels 460 and 470. The shape of the extrusion 404 allows it to slide into place and interlock the wall of the bed liner 400 to the floor section 405 and then be anchored to the floor of the pickup cargo bed with screws. It is capable of being pressed or punch locked at area 435 to permanently secure the liner 400 to the floor extrusion 404. The channel 460 is designed to allow the floor panel to slide in place.

Figure 15B:
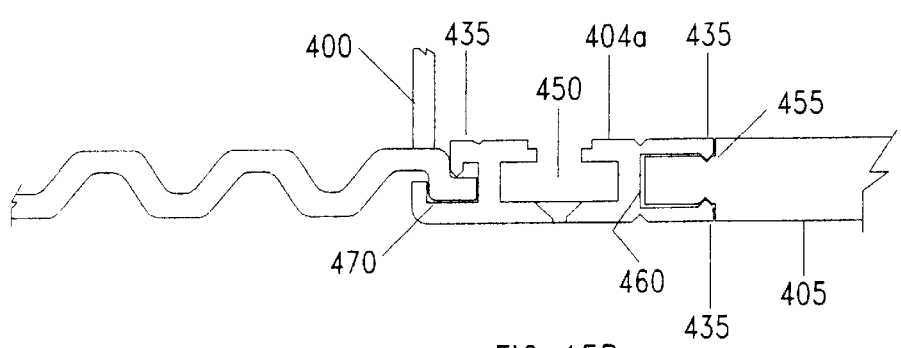
FIG. 15B is a view similar to FIG. 15A and showing a second embodiment of extrusion used to secure the bed liner side and the floor of the bed liner of the system.

FIG. 15B is a cross sectional view of another embodiment of the elongate floor extrusions designated 404a. These extrusions are embodied in the floor of the bed liner. The extrusion 404a provides the same means of securing the side wall of the bed liner 400 and the wooden floor section 405 in place by way of recessed "U-shaped" channels 460 and 470 as the preferred embodiment. The difference being that inwardly facing ribs or edges 455 are provided in the recessed "U-shaped" channel 460 to provide for a press lock to the wooden floor segment 405.

Figure 15C:
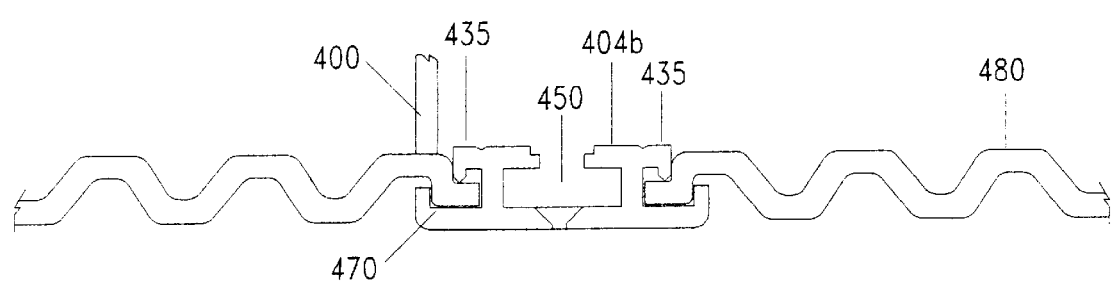
FIG. 15C is also similar to FIG. 15A and showing a third embodiment of extrusion used to secure the bed liner side and a second embodiment of the floor of the bed liner of the system.

A third embodiment of floor extrusion 404b is seen in FIG. 15C. This version embodies the same recessed channel 470 to accept a vacuum formed floor segment 480 in place of the wooden floor section 405, both of which can be pressed or punch locked at area 435 to permanently lock the bed liner 400 and the vacuum formed floor segment 480 to the extrusion 404b.

Figure 15D:
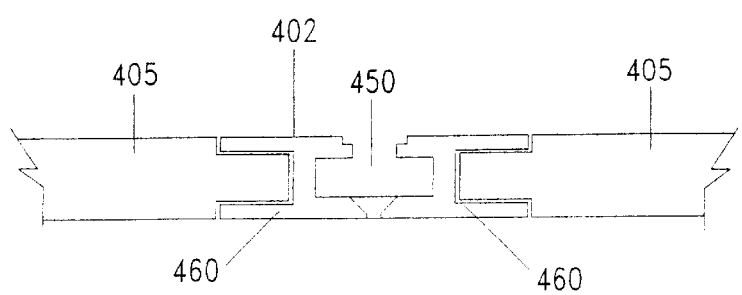
FIG. 15D is a cross sectional view of an extrusion used to secure two sections of the floor.

Reference is now made to FIG. 15D which is a cross sectional view of the preferred embodiment of the elongate central extrusion 402 which is embodied in the centre of the floor of the bed liner 400. The extrusion 402 provides a means of securing the two wooden floor sections 405 in place by use of recessed "U-shaped" channels 460 located one to each side of the extrusion. The central extrusion 402 is meant to slide into place and be fastened to the floor of the cargo bed of the pickup truck.

Figure 16:
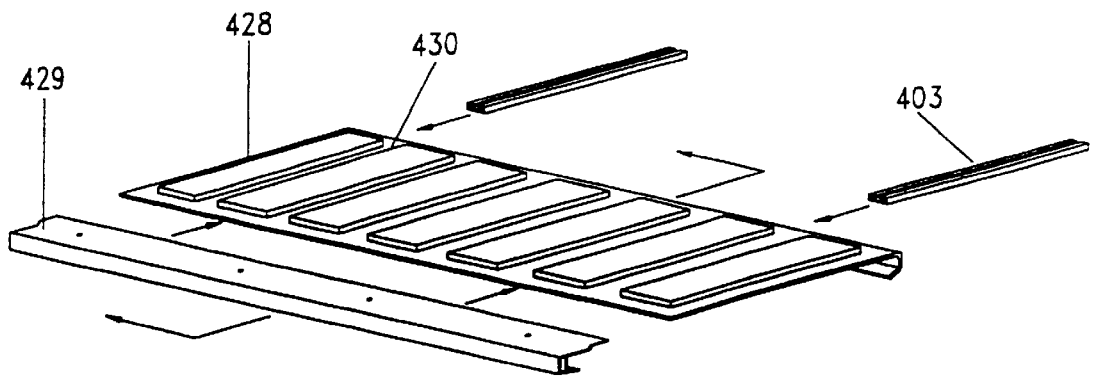
FIG. 16 is an exploded isometric view of a tail gate protector which forms part of the bed liner of the system.
Figure 17:
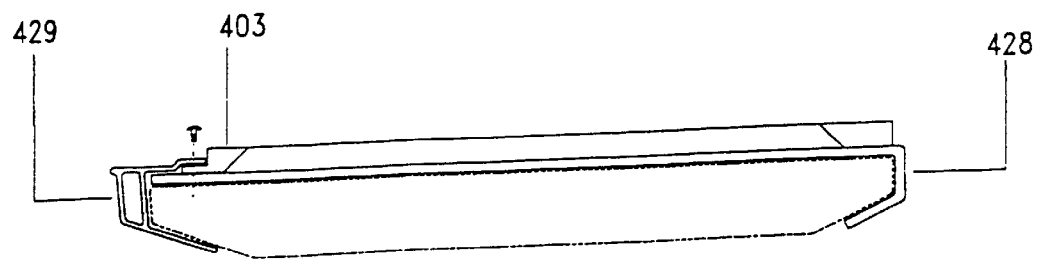
FIG. 17 is a cross sectional view of the tail gate protector which forms part of the bed liner of the system.

The structure can include a tail gate protector such as that shown in FIGS. 16 and 17. The protector is a two-part assembly consisting of a vacuum formed tail gate liner 428 and an extruded cap 429 combined to fully cover the inner wall of the tail gate. The formed tail gate protector embodies a plurality of recessed grooves 430 to accept elongate extruded strips 403 having T-slots meant to secure cargo or useful tools when the tail gate is used as a work bench in the down position.

Figure 18:
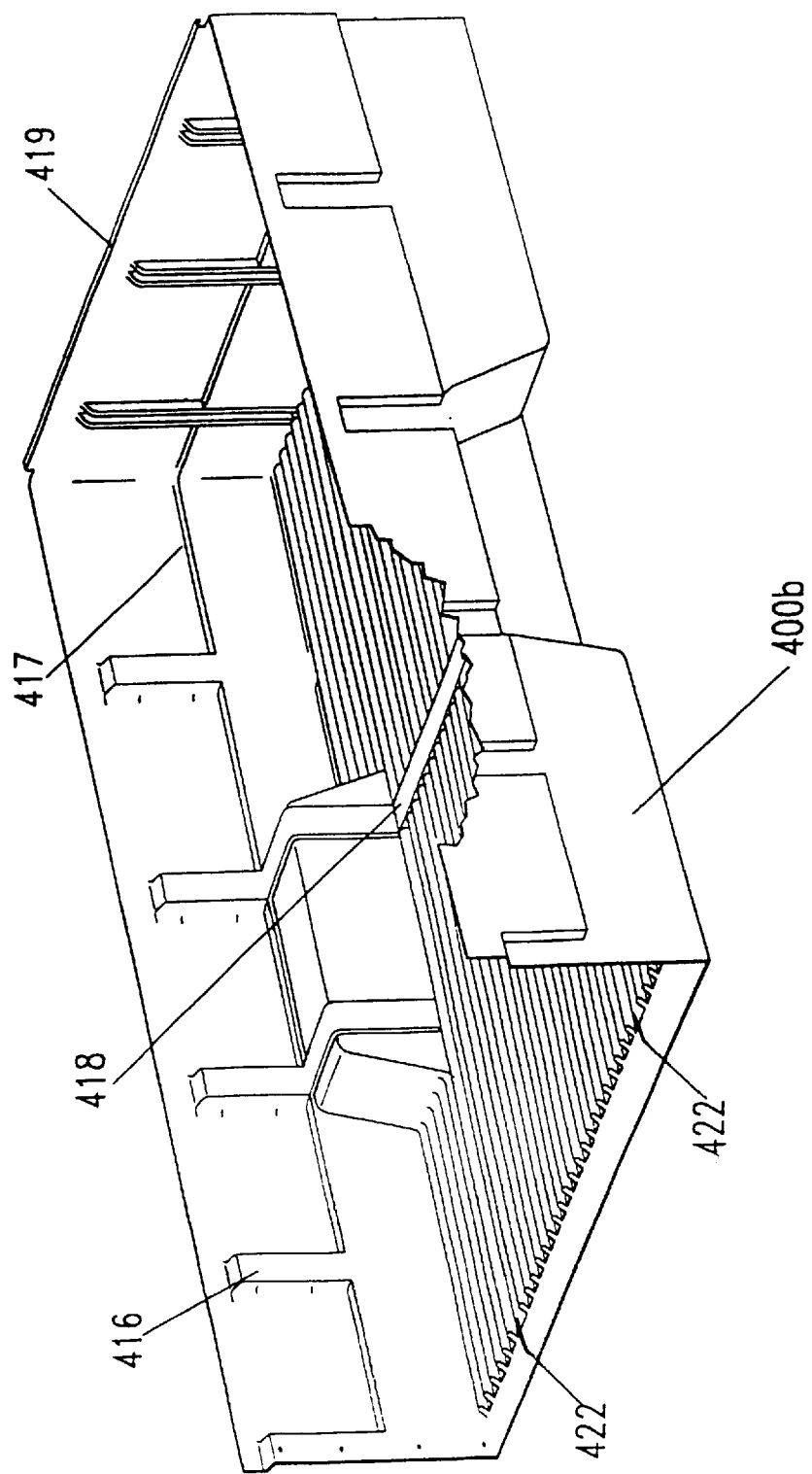
FIG. 18 is an isometric view of a second embodiment of the bed liner with portions broken away, the bed liner being formed in one piece.

Reference is now made to FIG. 18 which illustrates a second embodiment of bed liner 400b where the side walls, front wall and floor are formed in one piece. The bed liner 400b has sides and front walls which define a plurality of vertically formed protruding ribs 416 meant to accept a variety of vertically placed extruded strips 403 which embody T-slots (as seen in FIG. 12) to secure cargo and vertical bed dividers 406 (FIG. 10). The second embodiment also has a horizontally placed protrusion 417 meant to accept a variety of horizontally placed cargo dividers and shelves 415 shown in FIG. 10.

The floor of the one piece bed liner 400b embodies a pair of integral elongate channels 422 running lengthwise and adapted to accept extruded strips 403 which are bolted in place through the floor of the bed liner 400b and through the cargo bed 100b (FIG. 1). The strips 403 embody inverted T-slots to act as anchoring points for securing cargo and cargo bed dividers 406 (FIG. 10). A raised rib 418 extends across the liner 400b extending over the floor, side walls and wheel wells. The rib 418 is perpendicular to the recessed channels 422 providing a base to seal the bottom of the cross-bed anchor beam 300 and side edges of a vertically placed cargo bed divider 306 (FIG. 10). The front wall includes an inverted channel 419 at its top edge to lock over the top lip of the front wall of the truck bed. The anchor rail 200a is used to interlock the one piece liner 400b side walls to the truck bed rails as seen in FIGS. 7 and 7A.

FIGS. 19, 20 and 21 show the third, fourth and fifth embodiment of the bed liner where the bed liner side section are formed to incorporate storage compartments. FIG. 19 shows a bed liner side section 400c with a storage compartment located at the rear of the wheel well portion of the cargo bed. FIG. 20 shows a bed liner side section 400d with a storage compartment located at the front of the wheel well portion of the cargo bed and having a lid 425. FIG. 20A shows a cross sectional view of the bed liner side section 400d and how it interlocks with the anchor rail 200a and floor extrusion 404 of the system. FIG. 21 shows a bed liner side section 400e with a storage compartment located the full length of the cargo bed. Access to the storage compartments can either be through top lids 424 of the compartments (FIGS. 20 and 21) or through an end door 423 of the compartment (FIG. 19). All of the doors can have locks. The height of the compartments can be increased up to the extrusion 200a (FIG. 20A).

Figure 22:
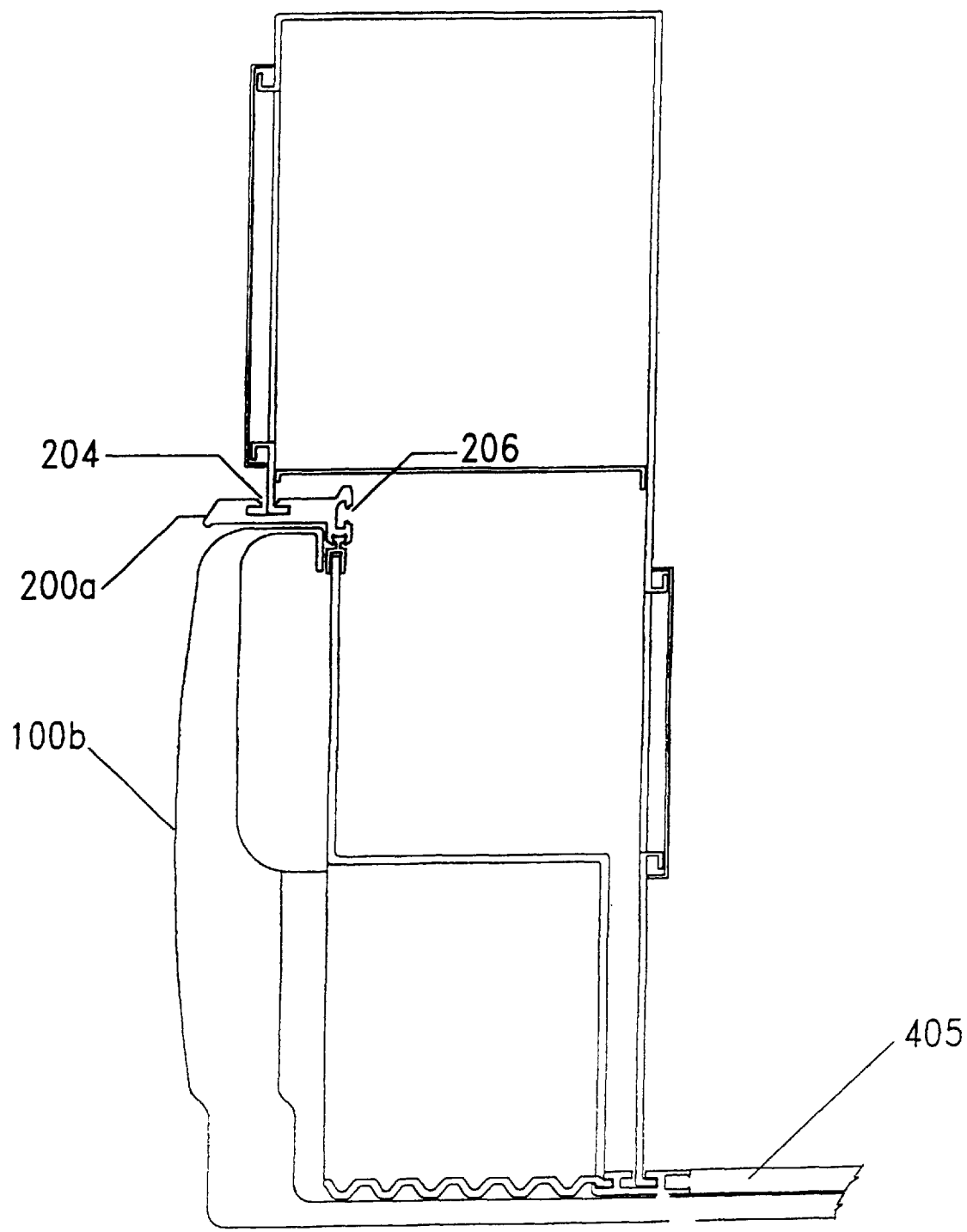
FIG. 22 is a cross sectional view of the cargo anchoring and protection system with one of various embodiments of a slide-in storage compartment secured to the T-slots in the anchor rail and the floor extrusion.

FIG. 22 shows another variation of storage box incorporating the invention. As seen in this Figure, the box is adapted to slide into and be secured in place by way of the T-slots embodied in the anchor rail 200a and the floor extrusion 404. The use of the T-slots embodied in the cargo anchoring and protection system allows a multitude of storage cabinet configurations to be easily installed or removed depending on the needs of the pickup truck owner.

(c) Enclosure

Reference is next made to FIG. 23 which is a side view of a preferred cargo enclosure 500 having a front storage compartment 500a extending across the cargo bed behind the truck cab and including end doors 510 providing access, and a centre lid 500b also providing access and located rearwardly of the compartment 500a. Similarly, a rear lid 500c provides access resulting in a lockable enclosure for the bed of a pickup truck.

A variation to the FIG. 23 structure is shown in FIG. 24. This second embodiment of the enclosure system has a front storage compartment 500d which has an increased height to cover the rear window of the pickup truck cab. This allows the rear window to be replaced by a weather seal 530 to allow access directly from the cab into the storage compartment 500d. A window can be provided on the rear wall of the enclosure 500d to provide a view of the cargo area from the truck cab.

A third embodiment of enclosure system is shown in FIG. 25. This enclosure system has the front storage compartment 500d combined with a full cab height enclosure 500e which covers the full length of the cargo bed of a pickup truck. The front, side, and top edges of the enclosure 500e have a weather seal connection with the sides and top rear edges of the compartment 500d.

All embodiments of the enclosure system can be removably attached and they are sealed and supported by the anchor rails 200a of the system. The enclosure system provides full coverage of the cargo bed area. However, the arrangement is such that the parts 500b, 500c, and 500e can be easily removed separately if desired starting from the rear. All of the enclosure assemblies of the system adapt to be mounted on the anchor rail 200a at the same time as the cab guard 600 to provide safety protection at all times.

Figure 26:
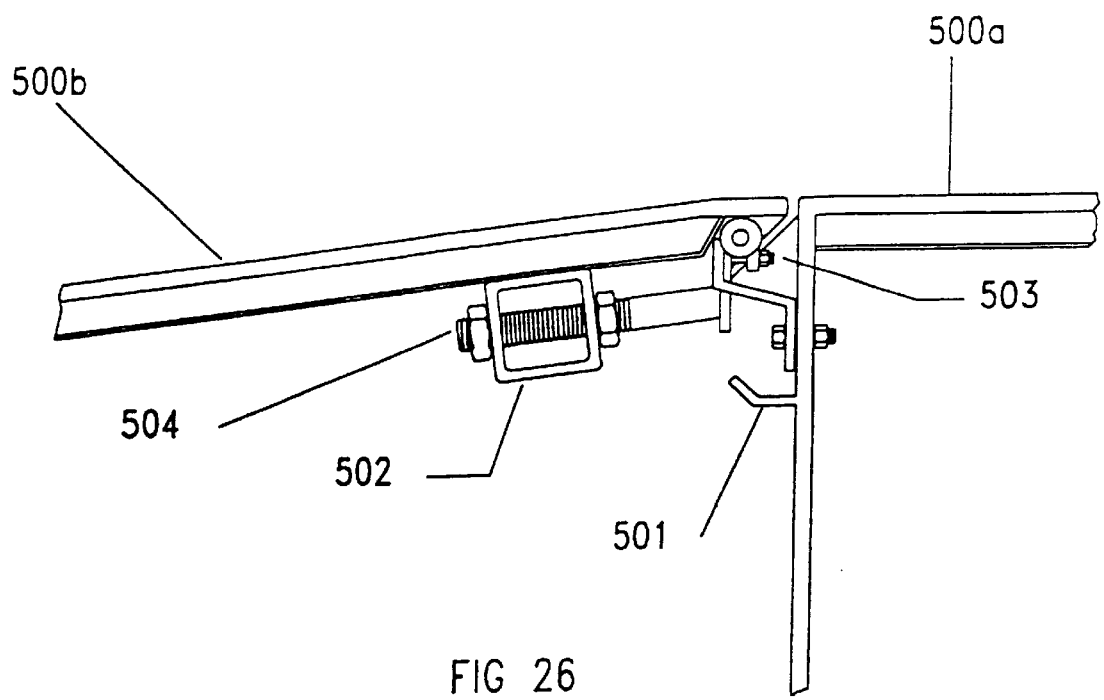
FIG. 26 is a cross sectional view of a hinging system between the first and second portions of the preferred embodiment of the enclosure.

Details of the enclosure system will now be described. The centre lid 500b is removably affixed to the rear vertical wall of the front storage compartment 500a of the enclosure system by way of a pair of adjustable hinges as shown in FIG. 26. The hinge assembly incorporates a hinge 503 and adjustable threaded rods 504 which protrude through a cross beam 502 permanently attached to the underside of the centre enclosure lid 500b. This permits the centre lid 500b to be positioned squarely on the anchor rails 200a of the system. The front storage compartment of the enclosure system incorporates a protruding channel 501 formed into the rear vertical wall providing weather drainage between the two compartments.

Figure 27:
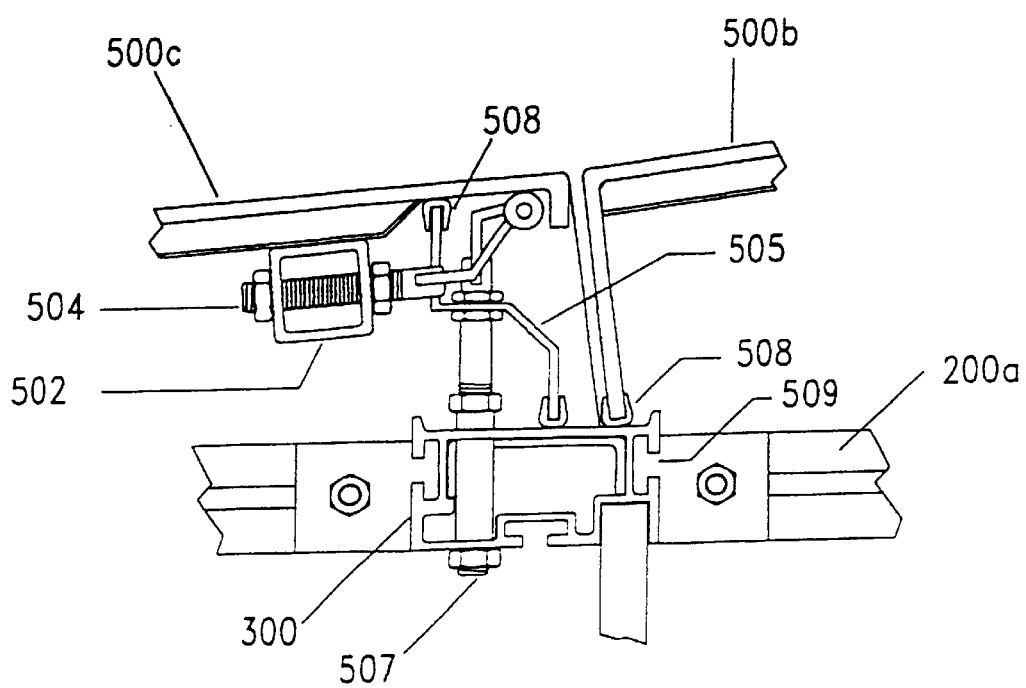
FIG. 27 is a cross sectional view of a hinging system between the second and third portions of the preferred embodiment of the enclosure.

FIG. 27 is a sectional view showing where the lids 500b and 500c meet. The cross bed anchor beam 300 provides support for the rear vertical wall of the centre enclosure lid 500b and the front wall of the lid 500c which rests and seals on the beam. The hinge assembly incorporates horizontally adjustable threaded rods 507 which protrude through a weather sealed sleeve and secure the rear lid 500c to the cross bed anchor beam 300. The hinge assembly also incorporates horizontally adjustable threaded rods 504 which provide a means of squarely positioning the rear lid 500c of the enclosure system. Weather sealing between the rear lid 500c and the anchor beam is in the form of an offset elongate member 505 which extends across the full width of the cross bed anchor beam 300. It is adjustably affixed to the vertical threaded rods 507 of the hinge assembly and embodies a flexible channel type seal 508 on either edge. A T-slot 509 will support the locking latch bolt for the enclosure lid 500b.

Figure 28:
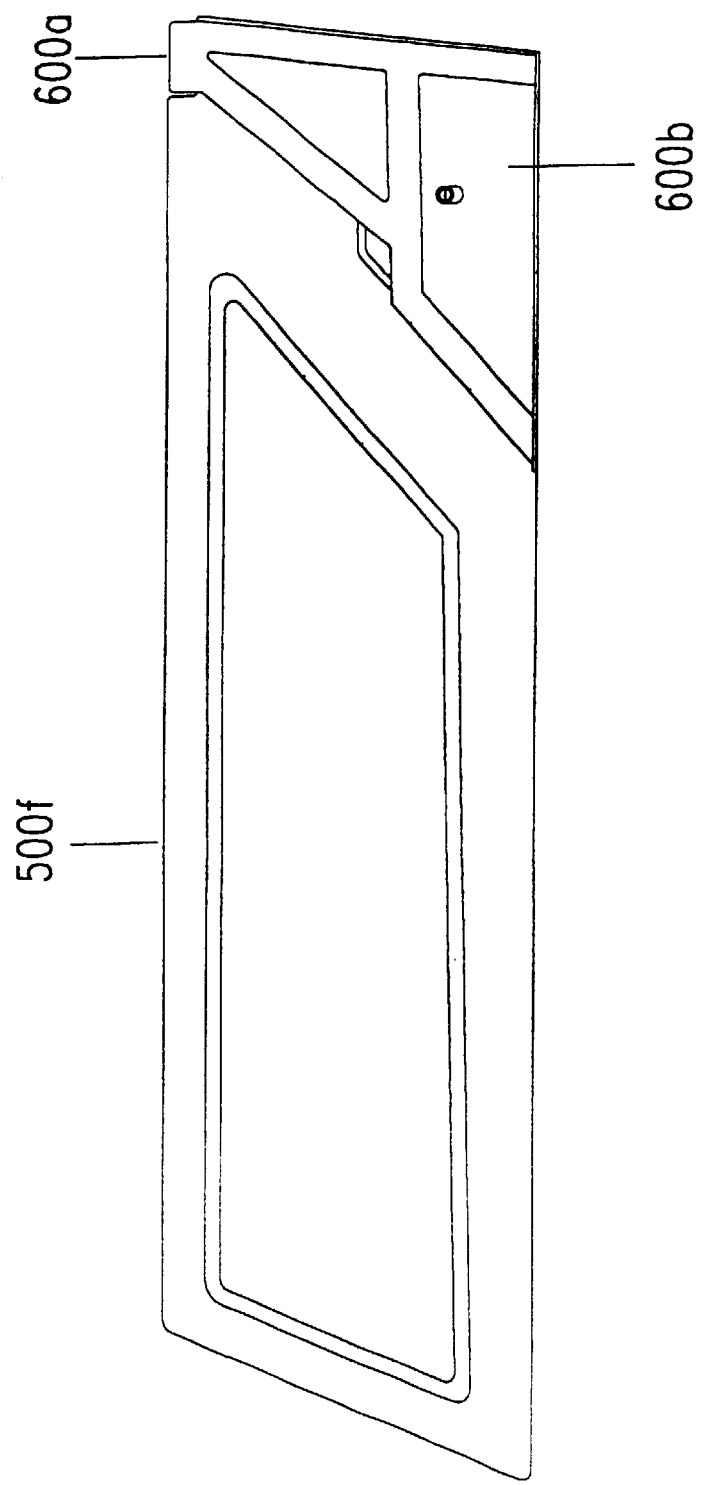
FIG. 28 is a side view showing a fourth embodiment of the enclosure included with the cab guard of the system.

Further embodiments of enclosure are possible. FIG. 28 shows a fourth embodiment of enclosure 500f which is a one piece cab height enclosure that mounts to the anchor rails 200a of the system. It can be used at the same time as the cab cars guard front segment 600a and the over cab rack 700d (FIG. 1), providing protection to the enclosure in the case of a roll over. The enclosure embodies a rear windowed access door and a plurality of side windows which can be locked to secure the cargo area of the pickup truck.

(d) Cab Guard

Figure 29B:
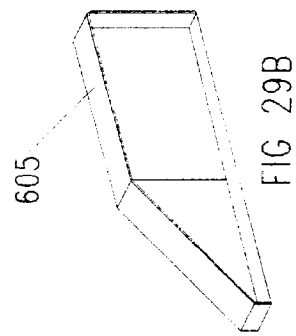
FIG. 29B is an isometric view of a preferred embodiment of an accessory door sealing frame.
Figure 29A:
FIG. 29A is a side view of the cab guard assembly of the system.
Figure 29:
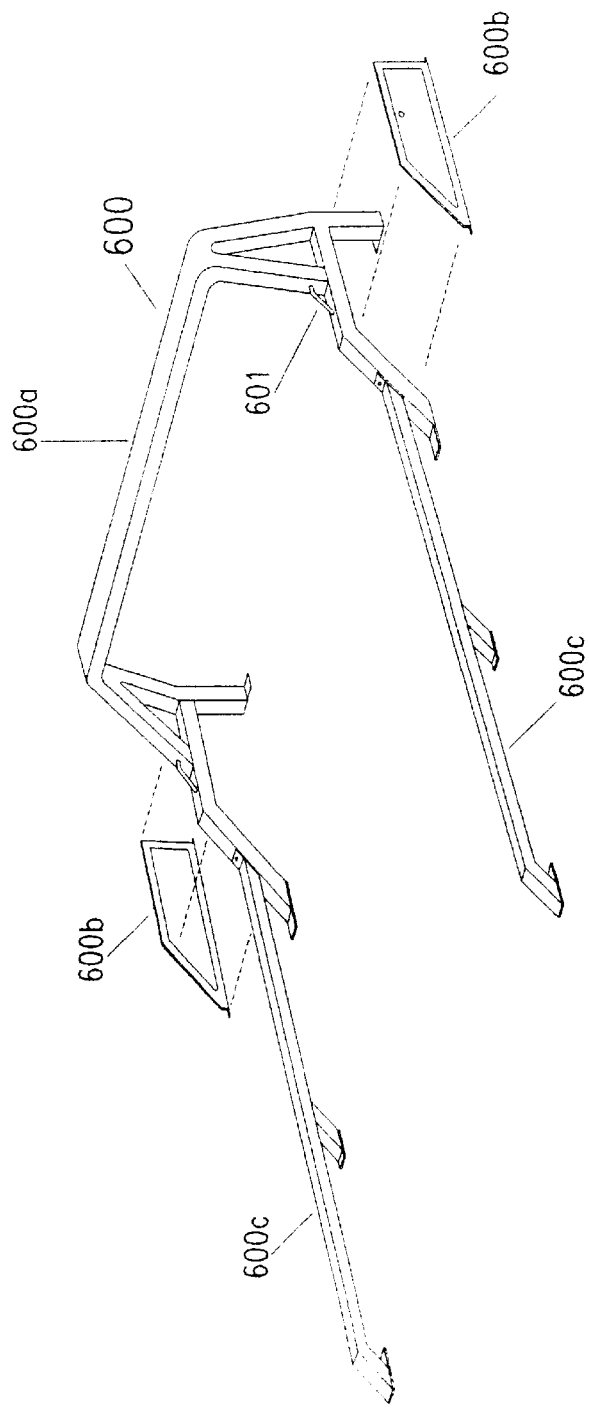
FIG. 29 is an exploded isometric view of a cab guard assembly of the system.
Figure 33:
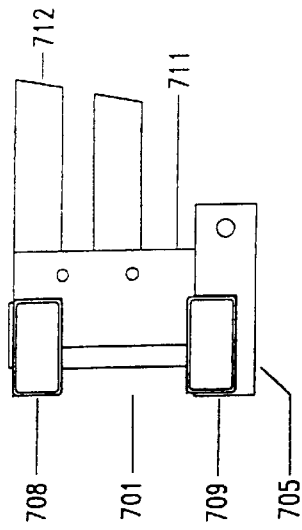
FIG. 33 is a cross sectional view of the internal structure of the bumper assembly of the system.
Figure 32:
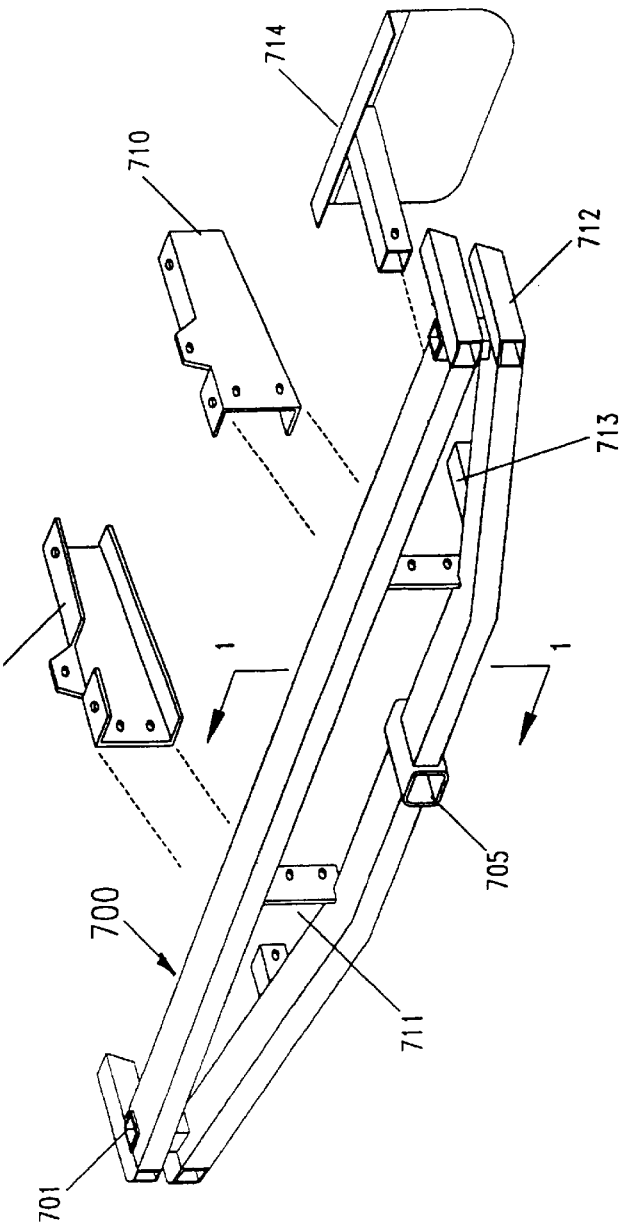
FIG. 32 is an exploded isometric view of the internal structure of the bumper assembly of the system.

The cab guard of the system shown in FIG. 29 consists of the front segment 600a of tubular construction having a general shape of the cab of the pickup truck and tubular braces affixed to either side of a tubular frame to connect to the T-slots 204 embodied in the anchor rails 200a (FIG. 4). These frames have doors 600b to either side to allow access to the front storage compartment 500a (FIG. 23) of the enclosure system. The cab guard 600 further comprises a pair of removable side rails 600c of tubular construction tapering from front to back plus a pair of cargo ties 601 (see also FIG. 29A) which are also attached to the cab guard front segment 600a and to the anchor rails 200a. When the front segment 600a is used in conjunction with the front storage compartments 500a and 500d (FIGS. 23 to 25), the end doors 510 are removed and replaced with doors 600b and sill extensions 605 shown in FIG. 29B. These extensions provide a weather seal between the enclosure 500a (FIG. 23) and the cab guard front segment 600a.

(e) Bumper

The cargo anchoring and protection system also includes the rear bumper 700 (seen in FIG. 1). Reference is now made to FIGS. 30 to 33 which show the bumper. The construction is of tubular welded components. Two vertically spaced square receivers 701 are located at the respective outward corners to accept the mating vertical stations of cargo rack 700d (FIG. 1). A horizontally extending square tubing receiver 705 is positioned centrally to accept a standard towing type hitch and a pair of vertically affixed plates 711 to either side of the receiver 705 are designed to accept universal type truck frame mounting plates 710. A pair of horizontally extending tubes 713 are positioned to accept removable mud flap assemblies 714 (one of which is shown). The outward corners include respective horizontally affixed tubes 712 acting to brace the molded cover skin 704 of the assembly and provide attachment points for the tail light protectors 700c seen in FIGS. 3 and 30. The economical, replaceable cover skin 704 is made of a thermoplastic or other suitable material formed to fit the contours of the welded assembly and provide an indented step and license plate pocket 702. The cover skin 704 also includes interlocking removable end covers 700b.

(f) Exemplary Use

Figure 34:
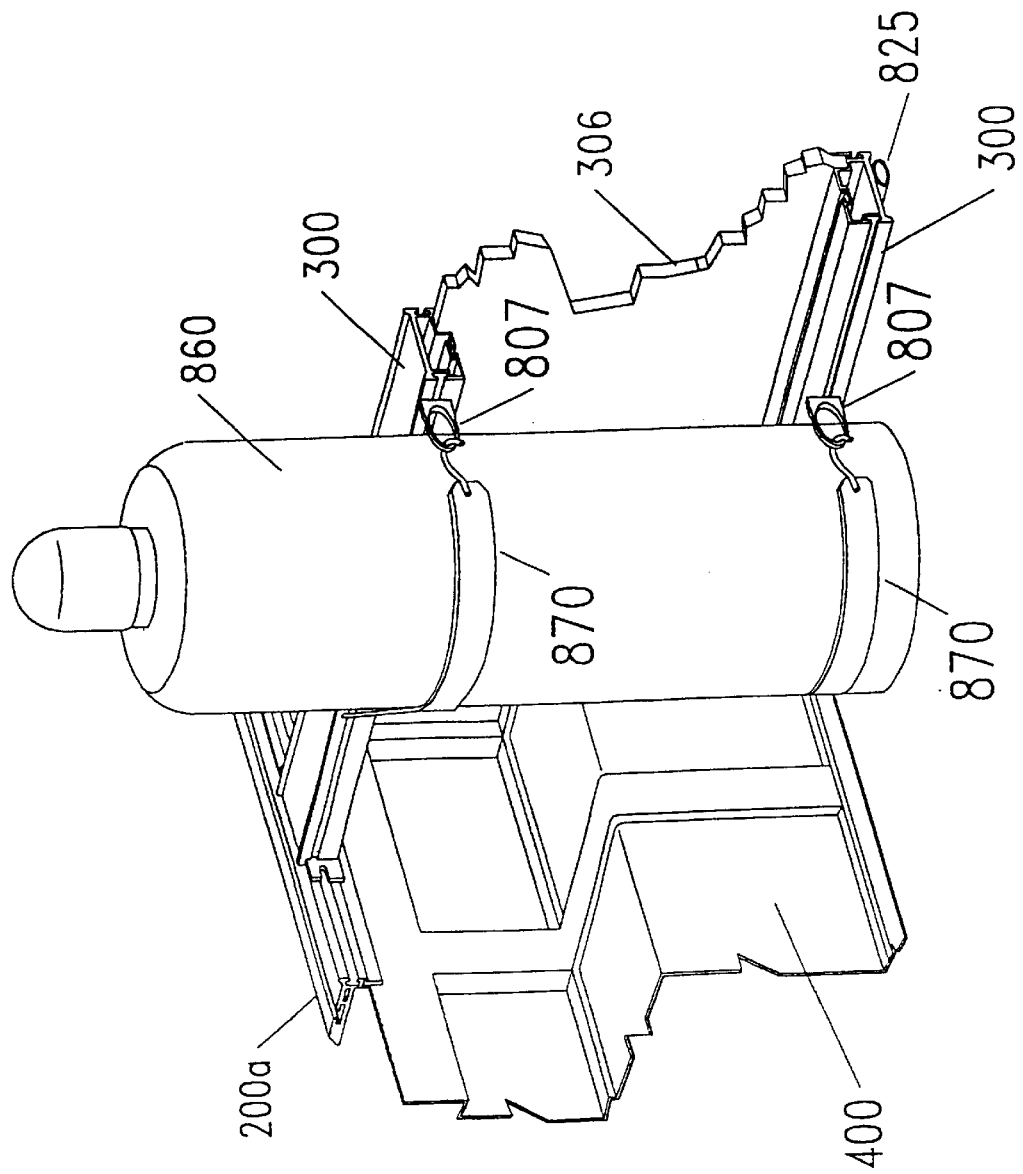
FIG. 34 is an isometric view of a portion of the cargo anchoring and protection system securing a propane bottle in place in the bed of a pickup truck.

The cargo anchoring and protection system provides numerous possibilities for securing cargo. FIG. 34 illustrates one example. A propane tank 860 is securely held in place in the cargo bed of a pickup truck outfitted with the preferred embodiment of the invention. The propane tank is secured in place by straps 870 which are attached to both the upper and lower cross bed anchor beams 300 using available T-slot anchoring eyes 807. FIG. 30 also shows the floor seal 825 used to seal the bed liner partition under the anchor beam 300.

It will now be apparent that the invention provides a cargo anchoring and protection system for pickup trucks. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations within the scope of the claims.

What I claim as my invention:

1. A cargo anchoring and protection system for a pickup truck, the system including:
    an attachment system adapted to be coupled to the side walls of the cargo bed of the pickup truck and including longitudinal slots facing into the cargo bed;
    a bed liner adapted to fit within the cargo bed and having side sections and a floor section;
    at least one attachment member adapted to slidably engage within the longitudinal slots and including means coupling the attachment member to the side sections whereby the liner can slide relative to the attachment system; and
    floor extrusions adapted to be attached to the floor of the cargo bed to hold the liner in position in the cargo bed.

2. A cargo anchoring and protection system as claimed in claim 1 in which the bed liner is a unitary moulded structure.

3. A cargo anchoring and protection system as claimed in claim 1 in which the side sections and floor sections are separate and adapted to be held in place in the cargo bed by the floor extrusions.

4. A cargo anchoring and protection system for pickup trucks comprising:
    an elongate anchor rail having a horizontal segment adapted to be mounted on top of a side of a cargo bed of a pickup truck, and a vertical segment adapted to extend downwardly in contact with the side of the cargo bed;
    a first channel extending along at least a portion of the vertical segment and adapted to face the interior of the cargo bed for use in coupling other elements to the anchor rail;
    a second channel extending along at least a portion of the vertical segment, the second channel opening downwardly;
    and an attachment member coupled to the second channel and adapted to slide axially along said second channel for coupling attachments to the anchor rail, the attachment member including gripping means for attachment to a cargo bed liner with the cargo bed liner extending downwardly from the vertical segment.

5. A cargo anchoring and protection system as claimed in claim 4 and further comprising a second anchor beam adapted to extend across the bottom of the cargo bed, the second anchor beam having a fourth channel extending along at least a portion of its length.

6. A cargo anchoring and protection system for pickup trucks comprising:
    a pair of elongate anchor rails each of which has a horizontal segment adapted to be mounted on top of a side of a cargo bed of a pickup truck, and a vertical segment adapted to extend downwardly in contact with the side of the cargo bed;
    first channels extending along at least portions of the respective vertical segments of the anchor rails and adapted to face the interior of the cargo bed for use in coupling other elements to the anchor rail;
    second channels extending along at least portions of the respective vertical segments of the anchor rails, the second channels opening downwardly;
    an anchor beam adapted to be slidably connected to the first channels in the anchor rails in an orthogonal arrangement whereby the anchor beam is movable longitudinally of the rails for sliding into a selected position along the length of the anchor rails;
    a third channel in the anchor beam extending along at least a portion of the length of the anchor beam; and
    a second anchor beam adapted to extend across the bottom of the cargo bed, the second anchor beam having a fourth channel extending along at least a portion of its length, the fourth channel being adapted to receive one or more anchor eyes.

7. A cargo anchoring and protection system as claimed in claim 6 wherein the third and fourth channels are adapted to be aligned to receive one or more vertically orientated cargo divider panels.

8. A cargo anchoring and protection system for pickup trucks comprising:
   a pair of elongate anchor rails each of which has a horizontal segment adapted to be mounted on top of a side of a cargo bed of a pickup truck, and a vertical segment adapted to extend downwardly in contact with the side of the cargo bed;
   first channels extending along at least portions of the respective vertical segments of the anchor rails and adapted to face the interior of the cargo bed for use in coupling other elements to the anchor rail;
   second channels extending along at least portions of the respective vertical segments of the anchor rails, the second channels opening downwardly; and
   an anchor beam adapted to be slidably connected to the first channels in the anchor rails in an orthogonal arrangement whereby the anchor beam is movable longitudinally of the rails for sliding into a selected position along the length of the anchor rails, the anchor beam including ends to mate with the respective first channels of the anchor rails for attachment to the anchor rails.

9. A cargo anchoring and protection system as claimed in claims 4, 6, or 8 wherein the horizontal segment of the anchor rail includes a seal to provide a weather seal between the anchor rail and the top of the cargo bed side.

10. A cargo anchoring and protection system as claimed in claims 4, 6, or 8 wherein the anchor rail defines upwardly facing anti-skid grooves.

11. A cargo anchoring and protection system as claimed in claims 4, 6, or 8 and further comprising at least one shim adapted to be placed under the horizontal segment of the anchor rail to level the rail.

12. A cargo anchoring and protection system as claimed in claim 4 wherein the second channel is generally circular in cross section and in which the attachment member is generally cylindrical, the arrangement being such that the attachment member is securely held in place when vertically aligned within said channel and can be released when rotated through a selected angle from the vertical.

13. A cargo anchoring and protection system as claimed in claims 4, 6, or 8 and further including an upwardly projecting longitudinal ridge forming a continuation of the vertical segment and extending above the horizontal segment to provide a water stop to deflect water away from the cargo bed.

14. A cargo anchoring and protection system for pickup trucks having a cargo bed including, parallel sides, the system comprising:
   a pair of elongate anchor rails, each of the rails having a horizontal segment adapted to be mounted on top of one of the respective sides of the cargo bed, and a vertical segment adapted to extend downwardly inside the cargo bed and in contact with a respective one of the sides;
   first channels in the respective vertical segments, the channels extending longitudinally and facing the interior of the cargo bed;
   means for attaching the anchor rails to the respective sides of the cargo bed;
   at least one anchor beam adapted to extend across the top of the cargo bed perpendicular to the anchor rails;
   mounting brackets at the ends of the anchor beam releasably coupling the beam to the anchor rails to permit adjustment longitudinally of the anchor rails and the truck bed;
   a cargo bed liner having a pair of side sections;
   floor extrusions adapted to be attached to the floor of the cargo bed parallel to the anchor rails, whereby the side sections can be coupled to the anchor rails at said first channels and to the floor extrusions to retain the side sections in place; and
   interlocking removable attachment members adapted to be attached to the side sections and extend upwardly, the attachment members being adapted to be slidably engaged in said first channels and rotatable transversely to permit the side section and members to be tilted as the section is moved longitudinally to clear the truck bed wheel well before moving the section angularly downwards into contact with the floor and the cargo bed.

15. A cargo anchoring and protection system as claimed in claim 14 and further comprising a tail gate protector adapted to be coupled to the tailgate of the trunk.

16. A cargo anchoring and protection system as claimed in claim 14 and further comprising at least one floor section adapted to be held in place by the floor extrusions.

17. A cargo anchoring and protection system as described in claims 16 or 14 in which the side sections of the cargo bed liner have a plurality of vertically and horizontally formed orthogonal ribs adapted to support divider panels to allow division of the cargo bed into discrete storage compartments.

18. A cargo anchoring and protection system as described in claims 15 16 or 14 in which each of the side sections defines a wheel well cover, and a storage compartment extending forwardly as an extension of the wheel well cover.

19. A cargo anchoring and protection system as claimed in claims 6, 8 or 14 and further comprising a cargo bed enclosure adapted to rest on the horizontal segments of the anchor rails and to be removably attached to the anchor rails to cover the cargo bed.

20. A cargo anchoring and protection system for a pickup truck, the system including:
   an attachment system adapted to be coupled to the side walls of the cargo bed of the pickup truck and including longitudinal slots;
   a front storage compartment adapted to extend across the cargo bed above the side walls of the cargo bed, the storage compartment having at least one end door providing access into the compartment from the side of the cargo bed;
   first attachment means adapted to releasably couple the storage compartment to the attachment system;
   a cab guard including a front segment adapted to extend about the periphery of the truck cab and providing access to said end door;
   second attachment means adapted to releasably couple the cab guard to the attachment system; and
   wherein the cab guard fits closely about said end door and in which the cab guard includes a door for alignment with said end door to provide the option of removing said end door.

21. A cargo anchoring and protection system for pickup trucks comprising:
   a pair of elongate anchor rails each of which has a horizontal segment adapted to be mounted on top of a side of a cargo bed of a pickup truck, and a vertical segment adapted to extend downwardly in contact with the side of the cargo bed;
   a pair of first channels extending along at least respective portions of the vertical segments and adapted to face the interior of the cargo bed for use in coupling other elements to the anchor rail;

a pair of second channels extending along at least respective portions of the vertical segments, the second channels opening downwardly;

an anchor beam adapted to be slidably connected to the first channels in the anchor rails in an orthogonal arrangement whereby the anchor beam is movable longitudinally of the rails for sliding into a selected position along the length of the anchor rails;

a cab guard adapted to be removably attached to said anchor rails to extend upwardly to protect the cab in the event of an accident; and a rear bumper including vertically orientated receivers, and a cargo rack adapted to be engaged in the receivers to combine with the cab guard to provide support for cargo.

22. A cargo anchoring and protection system for pickup trucks having a cargo bed including parallel sides, the system comprising:

a pair of elongate anchor rails, each of the rails having a horizontal segment adapted to be mounted on top of one of the respective sides of the cargo bed, and a vertical segment adapted to extend downwardly inside the cargo bed and in contact with a respective one of the sides;

first channels in the respective vertical segments, the channels extending longitudinally and facing the interior of the cargo bed;

means for attaching the anchor rails to the respective sides of the cargo bed;

at least one anchor beam adapted to extend across the top of the cargo bed perpendicular to the anchor rails;

mounting brackets at the ends of the anchor beam releasably coupling the beam to the anchor rails to permit adjustment longitudinally of the anchor rails and the truck bed;

a cab guard adapted to be removably attached to said anchor rails to extend upwardly to protect the cab in the event of an accident; and a rear bumper including vertically orientated receivers, and a cargo rack adapted to be engaged in the receivers to combine with the cab guard to provide support for cargo.

* * * * *